(12) United States Patent
McMullen et al.

(10) Patent No.: US 11,646,631 B2
(45) Date of Patent: May 9, 2023

(54) AXIAL GAP GENERATOR MEASUREMENT TOOL

(71) Applicant: Upwing Energy, Inc., Cerritos, CA (US)

(72) Inventors: Patrick McMullen, Villa Park, CA (US); Herman Artinian, Huntington Beach, CA (US)

(73) Assignee: Upwing Energy, Inc., Cerritos, CA (US)

( * ) Notice: Subject to any disclaimer, the term of this patent is extended or adjusted under 35 U.S.C. 154(b) by 933 days.

(21) Appl. No.: 16/544,579

(22) Filed: Aug. 19, 2019

(65) Prior Publication Data

US 2019/0368325 A1 Dec. 5, 2019

Related U.S. Application Data

(62) Division of application No. 15/857,510, filed on Dec. 28, 2017, now Pat. No. 10,385,665.
(Continued)

(51) Int. Cl.
*E21B 41/00* (2006.01)
*H02K 7/09* (2006.01)
(Continued)

(52) U.S. Cl.
CPC .............. *H02K 7/09* (2013.01); *E21B 4/003* (2013.01); *E21B 4/02* (2013.01); *E21B 4/04* (2013.01); *E21B 17/028* (2013.01); *E21B 41/0085* (2013.01); *E21B 43/121* (2013.01); *E21B 43/128* (2013.01); *E21B 47/008* (2020.05); *E21B 47/01* (2013.01); *E21B 47/06* (2013.01); *E21B 47/09* (2013.01); *E21B 47/12* (2013.01); *F04B 17/03* (2013.01); *F04B 47/04* (2013.01); *F04D 13/026* (2013.01); *F04D 13/064* (2013.01); *F04D 13/0633* (2013.01); *F04D 13/08* (2013.01); *F04D 13/086* (2013.01); *F04D 13/10* (2013.01); *F04D 25/0666* (2013.01); *F04D 29/041* (2013.01); *F04D 29/048* (2013.01); *F04D 29/051* (2013.01); *F16C 32/0474* (2013.01); *F16C 32/0476* (2013.01); *F16C 37/005* (2013.01); *H02H 7/005* (2013.01); *H02K 3/42* (2013.01); *H02K 5/132* (2013.01); *H02K 7/14* (2013.01); *H02K 7/1807* (2013.01); *H02K 11/21* (2016.01); *H02K 11/225* (2016.01);
(Continued)

(58) Field of Classification Search
CPC .......................... E21B 41/005; H02K 1/2793
See application file for complete search history.

(56) References Cited

U.S. PATENT DOCUMENTS 4,413,958 A 11/1983 Webb
5,731,645 A 3/1998 Clifton et al.
(Continued)

FOREIGN PATENT DOCUMENTS

GB 2501352 10/2013

*Primary Examiner* — Giovanna Wright
(74) *Attorney, Agent, or Firm* — Fish & Richardson P.C.

(57) ABSTRACT

A tool includes a device including a housing and a rotor, the rotor to rotate about a longitudinal axis, and an axial gap generator including a stator assembly positioned adjacent to the rotor. The axial gap generator generates a voltage signal as a function of a gap spacing between the stator assembly and the rotor, the gap spacing being parallel to the longitudinal axis.

14 Claims, 19 Drawing Sheets

Related U.S. Application Data

(60) Provisional application No. 62/561,067, filed on Sep. 20, 2017.

(51) Int. Cl.

| | | |
|---|---|---|
| *H02K 11/225* | (2016.01) | |
| *H02K 11/21* | (2016.01) | |
| *H02K 11/27* | (2016.01) | |
| *H02K 11/30* | (2016.01) | |
| *H02P 29/40* | (2016.01) | |
| *E21B 4/02* | (2006.01) | |
| *E21B 4/04* | (2006.01) | |
| *E21B 17/02* | (2006.01) | |
| *E21B 43/12* | (2006.01) | |
| *E21B 47/06* | (2012.01) | |
| *E21B 47/12* | (2012.01) | |
| *F04B 17/03* | (2006.01) | |
| *F04B 47/04* | (2006.01) | |
| *F04D 13/02* | (2006.01) | |
| *F04D 13/06* | (2006.01) | |
| *F04D 13/08* | (2006.01) | |
| *F04D 13/10* | (2006.01) | |
| *F04D 29/041* | (2006.01) | |
| *F04D 29/048* | (2006.01) | |
| *F04D 29/051* | (2006.01) | |
| *F16C 32/04* | (2006.01) | |
| *F16C 37/00* | (2006.01) | |
| *H02H 7/00* | (2006.01) | |
| *H02K 5/132* | (2006.01) | |
| *H02K 7/14* | (2006.01) | |
| *H02K 7/18* | (2006.01) | |
| *H02K 21/14* | (2006.01) | |
| *E21B 47/008* | (2012.01) | |
| *F04D 25/06* | (2006.01) | |
| *E21B 47/01* | (2012.01) | |
| *E21B 47/09* | (2012.01) | |
| *H02K 3/42* | (2006.01) | |
| *E21B 4/00* | (2006.01) | |
| *F16F 15/03* | (2006.01) | |
| *H02K 1/2793* | (2022.01) | |
| *H02K 5/128* | (2006.01) | |
| *H02K 15/03* | (2006.01) | |
| *E21B 47/07* | (2012.01) | |
| *E21B 33/12* | (2006.01) | |
| *E21B 43/16* | (2006.01) | |

(52) U.S. Cl.
CPC .............. *H02K 11/27* (2016.01); *H02K 11/30* (2016.01); *H02K 21/14* (2013.01); *H02P 29/40* (2016.02); *E21B 33/12* (2013.01); *E21B 43/168* (2013.01); *E21B 47/07* (2020.05); *F16C 32/044* (2013.01); *F16C 2380/26* (2013.01); *F16F 15/03* (2013.01); *H02K 1/2793* (2013.01); *H02K 5/128* (2013.01); *H02K 15/03* (2013.01); *H02K 2205/03* (2013.01)

(56) References Cited

U.S. PATENT DOCUMENTS

| | | |
|---|---|---|
| 6,167,965 B1 | 1/2001 | Bearden et al. |
| 6,504,279 B1 | 1/2003 | Oelsch et al. |
| 2012/0153620 A1 | 6/2012 | Artinian et al. |
| 2015/0050170 A1 | 2/2015 | Kozaki |
| 2015/0114632 A1 | 4/2015 | Romer et al. |
| 2015/0326094 A1 | 11/2015 | Cunningham et al. |
| 2016/0341012 A1 | 11/2016 | Riley et al. |
| 2017/0236627 A1* | 8/2017 | Walsh .................... H02K 55/00 62/51.1 |

* cited by examiner

AXIAL GAP GENERATOR MEASUREMENT TOOL

CROSS-REFERENCE TO RELATED APPLICATIONS

This application is a Divisional of and claims the benefit of priority to U.S. patent application Ser. No. 15/857,510, filed Dec. 28, 2017, which claims priority to U.S. Provisional Application No. 62/561,067, filed Sep. 20, 2017, the contents of which are incorporated by reference herein.

TECHNICAL FIELD

This disclosure relates to measurement tools and devices incorporating an axial gap generator.

BACKGROUND

Rotating equipment and tools often include a rotor that rotates on a longitudinal axis within a housing of the rotating equipment or tool. Rotating equipment can employ magnetic assemblies, such as magnetic bearings, permanent magnet assemblies, and/or electromagnetic assemblies to provide support and control to a rotor during operation. For example, electric motors and magnetic bearing assemblies intended for downhole environments often incorporate magnetic assemblies to power, control, and support a rotor within the electric motor and magnetic bearing assembly.

SUMMARY

This disclosure describes measurement tools incorporating an axial gap generator to measure axial position or a physical property about the axial gap generator.

In some aspects, a tool includes a device having a housing and a rotor, the rotor to rotate about a longitudinal axis, and an axial gap generator including a stator assembly positioned adjacent to the rotor, the axial gap generator to generate a voltage signal as a function of a gap spacing between the stator assembly and the rotor and parallel to the longitudinal axis.

This, and other aspects, can include one or more of the following features. The device can be a downhole-type device to operate in a downhole wellbore environment. The device can include a motor, a compressor, a blower, a pump, a thrust bearing, or a combination of these. The axial gap generator can determine an axial position of the rotor as a function of the generated voltage signal. The axial gap generator can determine axial position of the rotor for an active axial magnetic bearing system. The axial gap generator can vary the voltage signal based on a variance in the gap spacing in response to a displacement of the rotor relative to the stator assembly and parallel to the longitudinal axis. The stator assembly can include a first stator portion adjacent a first longitudinal side of the rotor, the gap spacing being a first gap spacing, and a second stator portion adjacent a second longitudinal side of the rotor opposite the first longitudinal side of the rotor. The axial gap generator can generate the voltage signal as a function of the first gap spacing between the first stator portion and the first longitudinal side of the rotor and a second gap spacing between the second stator portion and the second longitudinal side of the rotor. The axial gap generator can include a permanent magnet to generate a magnetic field through the axial gap generator. The axial gap generator can include an energized field coil to generate a magnetic field through the axial gap generator. The axial gap generator can be positioned adjacent to a longitudinal end of the rotor. The voltage signal can be the back electromotive force of the axial gap generator.

Certain aspects of the disclosure encompass a method including rotating a rotor of a device about a longitudinal axis and within a housing of the device, generating, with a stator assembly of an axial gap generator positioned adjacent to a rotor assembly of an axial gap generator, a voltage signal as a function of a gap spacing between the stator assembly and the rotor assembly, the gap spacing parallel to the longitudinal axis, the rotor assembly of the axial gap generator coupled to the rotor of the device, and varying, with the stator assembly, the voltage signal based on the gap spacing in response to a displacement of the rotor relative to the stator assembly.

This, and other aspects, can include one or more of the following features. The device can be a downhole device. The device can be a motor, pump, compressor, blower, or thrust bearing. The stator assembly can be mounted to the housing of the device. The voltage signal can be linearly proportional to the gap spacing. The voltage signal can be non-linearly proportional to the gap spacing. The method can further include receiving, with a controller, the voltage signal from the axial gap generator, and in response to receiving the voltage signal, determining, with the controller, an axial position of the rotor based on the received voltage signal. The method can further include determining, with the controller, a speed of the rotor based on a frequency of the received voltage signal. The method can further include generating, with a second stator assembly of a second axial gap generator positioned adjacent to the rotor assembly of the axial gap generator, a second voltage signal as a function of a second gap spacing between the second stator assembly and the rotor assembly, the second gap spacing parallel to the longitudinal axis, where the second stator assembly voltage signal is combined with the first stator assembly voltage signal to provide one voltage signal proportional to gap spacing. The first stator voltage signal can be 180 electrical degrees out of phase with the second stator voltage signal. The first stator voltage signal can be in phase with the second stator voltage signal. The first stator voltage signal can be of one polarity and the second stator voltage signal can be of the opposite polarity. The first stator voltage signal and the second stator voltage signal can be of one polarity. The method can further include generating, with a second stator assembly of a second axial gap generator positioned adjacent to the rotor assembly of an axial gap generator, a second voltage signal as a function of a second gap spacing between the second stator assembly and the rotor assembly, the second gap spacing parallel to the longitudinal axis, where the second stator assembly is mounted to a movable support structure, and moving, with the movable support structure, the second stator assembly parallel to the longitudinal axis based at least in part on a physical property of an environment about the movable support structure. The method can further include receiving, at a controller, the first-mentioned voltage signal from the first-mentioned axial gap generator and the second voltage signal from the second axial gap generator, determining, with the controller, an axial position of the rotor based on the received first-mentioned voltage signal, and in response to determining the axial position of the rotor, determining, with the controller, the physical property of the environment about the movable support structure based at least in part on the second voltage signal.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
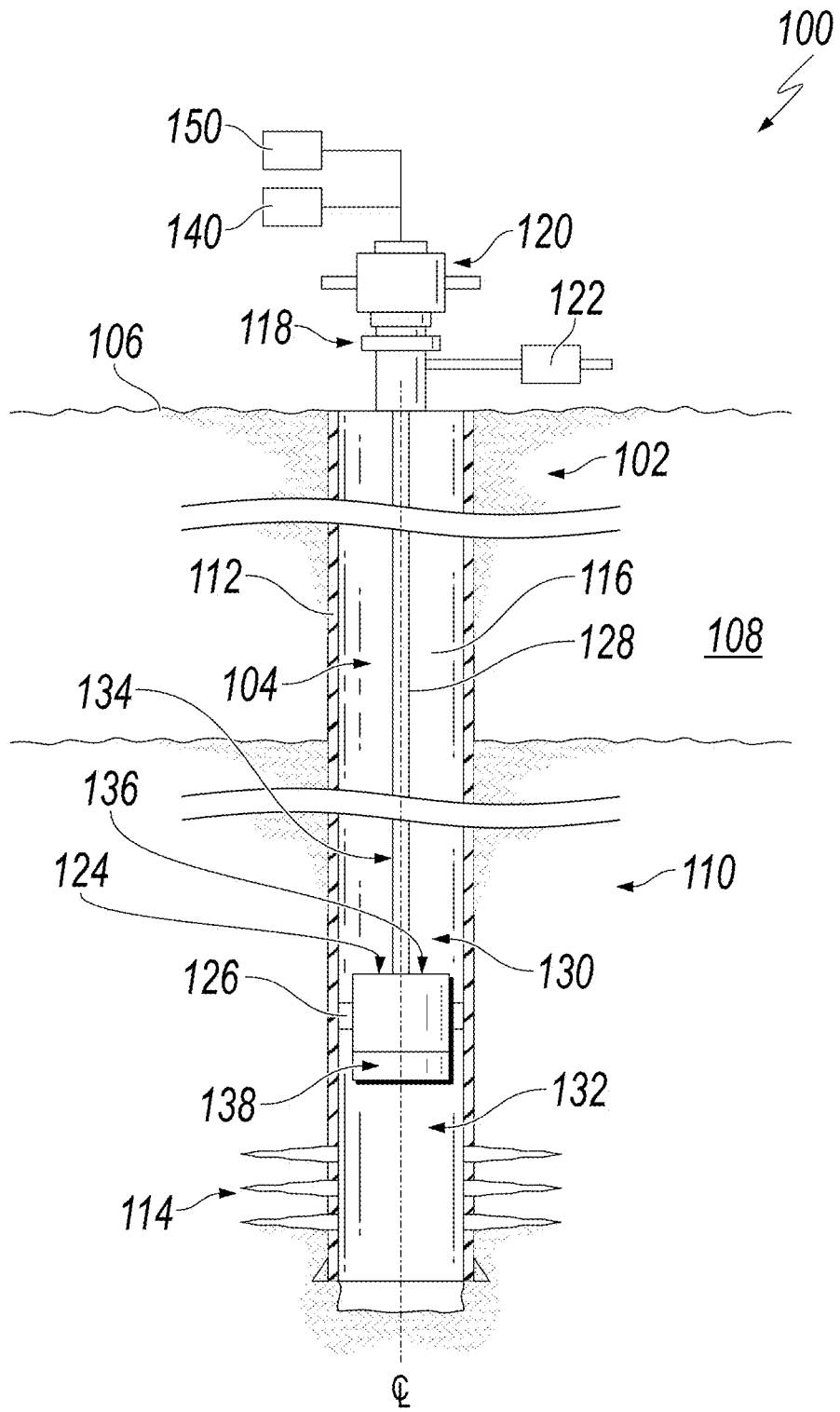
FIG. 1 is a schematic side view of an example well system including a downhole-type tool.

Many devices with rotating rotors incorporate electronics and sensors to provide feedback on operating conditions and environment, and typically include small sensor devices with local electronics that decode a measurement and transmission software to send data reflective of the decoded measurement to a processor separate from the sensors via communication line. However, electronics and sensors are often limited, fragile, and unreliable in harsh environments. For example, in a downhole environment, it is sometimes difficult to reliably measure parameters, and/or control, power, and operate any equipment due to the presence of caustic fluids, pressures, temperatures, and relative distance from any supporting equipment that cannot be repackaged to fit in a small diameter tube. Many electronic devices and sensors placed in a downhole environment are prone to damage and unreliability. In addition, installation and removal of tools in a well often requires the well to be "shutdown" or "killed" to prevent fluid flowing to the surface that can cause damage or injury, a very costly process not only in performing the work but also in lost production and risk in damaging the well where further production is jeopardized.

While all these issues and risks exist for downhole operations, the potential benefit of well intervention with production enhancing tools and measurement equipment is often worth the risk because of the enhanced production it can offer. While these benefits have been demonstrated, reliability and robustness of equipment in this harsh environment is not close to conventional topside mounted equipment. The concepts described herein are able to improve reliability and robustness of equipment by incorporating axial gap generators interacting with a rotating rotor to provide one or more measurements of a physical property of a device or an environment, provide control to a device, and/or generate power for a device, for example, without requiring fragile or sensitive electronic devices to be disposed in a harsh environment such as a downhole environment. For example, the concepts described herein utilize one or more axial gap generators sensitive to an axial gap spacing between a rotor and the axial gap generator for measurements and/or power generation locally at a rotating device, which can be used in a variety of applications, described in more detail later. In some examples, axial generators are incorporated in a magnetic bearing system for rotor support, a magnetic thrust bearing for thrust support, a high speed permanent magnet motor for torque, a sensorless long distance variable frequency drive or variable speed drive, magnetic bearing controls, advanced fluid compression and pump configuration, or a combination of these. The use of axial gap generators allows for reliable measurement of an axial gap spacing between a rotor and the generator, where the axial gap spacing can correspond to an axial position of the rotor, a pressure of a surrounding environment, a temperature of a surrounding environment, and/or an axial force for a corresponding magnetic bearing. For example, the axial gap spacing between the rotor and the axial gap generator can provide an electronic signal (e.g., voltage signal, back electromotive force signal, and/or other signal) reflective of a position, temperature, and/or pressure of or surrounding the rotor, or an amount of power reflective of a magnetic force to bias the rotor in a direction (e.g., to a balanced, neutral position). The axial gap generators described herein provide measurements, control, and/or power, and are more reliable and robust than electronic devices and sensors conventionally used for measurement, control, and/or power, for example, in a downhole environment or other environments.

While axial generators are shown and described later in a well system and incorporated with a downhole-type tool, the axial generators are applicable to tools and devices having a rotatable rotor in above-ground or surface applications, and are not limited to downhole devices and tools. For example, the axial gap generators described herein can be used in a rotating machine, turbocharger, motor, compressor, pump, blower, turbine, thrust bearing assembly, and/or any other rotating equipment.

FIG. 1 is a schematic partial cross-sectional side view of an example well system 100 constructed in accordance with the concepts herein. The well system 100 includes a well 102 having a wellbore 104 that extends from the terranean surface 106 through the earth 108 to one or more subterranean zones of interest 110 (one shown). The well system 100 enables access to the subterranean zones of interest 110 to allow recovery, i.e., production of fluids to the terranean surface 106 and, in certain instances, additionally or alternatively allows fluids to be placed in the earth 108. In certain instances, the subterranean zone 110 is a formation within the Earth defining a reservoir, but in other instances, the zone 110 can be multiple formations or a portion of a formation. For simplicity sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the terranean surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadingly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached to the wellhead 118. The Christmas tree 120 includes valves used to regulate flow into or out of the well 102.

The well system 100 includes a downhole-type tool 136 with a rotor (not shown) configured to rotate about a longitudinal axis (e.g., parallel to a centerline of the wellbore 104), and a measurement tool 138 including one or more axial gap generators (not shown) positioned proximate to the rotor of the downhole-type tool 136. The downhole-type tool 136 can take many forms, and perform a variety of functions based on the type of well operation intended for the well system 100. For example, the downhole-type tool 136 can include a motor, a compressor, a blower, a pump, an impeller, a thrust bearing assembly, and/or another device that includes a rotor that rotates during operation. The measurement tool 138 includes the one or more axial gap generators, and can attach to or be integral with the downhole-type tool 136 to interact with the rotor and measure a local physical characteristic and/or generate an amount of power. The measurement tool 138 is described in greater detail later. A variable speed drive (VSD) 140 is schematically shown in FIG. 1 as connected to the wellhead 118. The VSD 140 can provide power and control to the downhole-type tool 136, as described in more detail later.

In the example well system 100 of FIG. 1, the downhole-type tool 136 is shown as a downhole-type artificial lift system 124 residing in the wellbore 104, for example, at a depth that is nearer to subterranean zone 110 than the terranean surface 106. The example well system 100 also includes a surface compressor or pump 122 residing on the terranean surface 106 and fluidly coupled to the well 102 through the Christmas tree 120. The surface compressor or pump 122 can include a variable speed or fixed speed compressor. The surface compressor or pump 122 operates to draw down the pressure inside the well 102 at the surface 106 to facilitate production of fluids to the surface 106 and out of the well 102. The downhole artificial lift system 124, being of a type configured in size and robust construction for installation within a well 102, assists by creating an additional pressure differential within the well 102. In particular, casing 112 is commercially produced in a number of common sizes specified by the American Petroleum Institute (the API), including 4½, 5, 5½, 6, 6⅝, 7, 7⅝, 16/8, 9⅝, 10¾, 11¾, 13⅜, 16, 116/8, and 20 inches, and the API specifies internal diameters for each casing size. The downhole artificial lift system 124 can be configured to fit in, and (as discussed in more detail below) in certain instances, seal to the inner diameter of one of the specified API casing sizes. Of course, the downhole artificial lift system 124 can be made to fit in and, in certain instances, seal to other sizes of casing or tubing or otherwise seal to the wall of the wellbore 104. While only one downhole-type artificial list system 124 is shown residing in the wellbore 104, more than one may be used.

Additionally, as a downhole-type tool 136 or any other downhole system configuration such as the downhole type artificial lift system 124, a pump, compressor, or multi-phase fluid flow aid that can be envisioned, the construction of its components are configured to withstand the impacts, scraping, and other physical challenges the downhole-type tool 136 will encounter while being passed hundreds of feet/ meters or even multiple miles/kilometers into and out of the wellbore 104. For example, the downhole-type tool 136 can be disposed in the wellbore 104 at a depth of up to 20,000 feet (6,100 meters). Beyond just a rugged exterior, this encompasses having certain portions of any electronics being ruggedized to be shock resistant and remain fluid tight during such physical challenges and during operation. Additionally, the downhole-type tool 136 (e.g., the downhole artificial lift system 124) can be configured to withstand and operate for extended periods of time (e.g., multiple weeks, months, or years) at the pressures and temperatures experienced in the wellbore 104, which can exceed 400° F./205° C. and pressures over 2,000 pounds per square inch/13,790 kPa, and while submerged in the well fluids (gas, water, or oil as examples). Finally, as a downhole-type tool 136, the downhole-type tool 136 can be configured to interface with one or more of the common deployment systems, such as jointed tubing (i.e., lengths of tubing joined end-to-end, threadingly and/or otherwise), a sucker rod, coiled tubing (i.e., not-jointed tubing, but rather a continuous, unbroken, and flexible tubing formed as a single piece of material), or wireline with an electrical conductor (i.e., a monofilament or multifilament wire rope with one or more electrical conductors, sometimes called e-line) and thus have a corresponding connector (e.g., a jointed tubing connector, coiled tubing connector, or wireline connector). In FIG. 1, the downhole-type tool 136 is shown deployed on wireline 128.

In some implementations, a seal system 126 is integrated or provided separately with the downhole-type tool 136, as shown in FIG. 1 as with the downhole-type artificial lift system 124. The seal system 126 divides the well 102 into an uphole zone 130 above the seal system 126 and a downhole zone 132 below the seal system 126. FIG. 1 shows the downhole-type artificial lift system 124 positioned in the open volume of the bore 116 of the casing 112, and not within or a part of another string of tubing in the well 102.

The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the artificial lift system 124 creates in the well 102. In some instances, the seal system 126 of the downhole-type artificial lift system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type artificial lift system 124 from a pressure in the wellbore 104 uphole of the seal system 126 of the downhole-type artificial lift system 124. Although FIG. 1 includes both the surface compressor or pump 122 and the artificial lift system 124, in other instances, the surface compressor or pump 122 can be omitted and the artificial lift system 124 can provide the entire pressure boost in the well 102.

In some implementations, the downhole type artificial lift system 124 can be implemented to alter characteristics of a wellbore by a mechanical intervention at the source. Alternatively or in addition to any of the other implementations described in this disclosure, the downhole type artificial lift system 124 can be implemented as a high flow, low pressure rotary device for gas flow in sub-atmospheric wells. Alternatively or in addition to any of the other implementations described in this disclosure, the downhole type artificial lift system 124 can be implemented in a direct well-casing deployment for production through the wellbore. While the downhole type artificial lift system 124 is described in detail as an example implementation of the downhole-type tool 136, alternative implementations of a downhole system as a pump, compressor, or multiphase combination of these can be utilized in the wellbore 104, for example, to effect increased well production.

The downhole-type tool 136 is shown in FIG. 1 as the downhole artificial lift system 124, which can locally alter the pressure, temperature, and/or flow rate conditions of the fluid in the wellbore 104 proximate the artificial lift system 124 (e.g., at the base of the wellbore 104). In certain instances, the alteration performed by the artificial lift system 124 can improve, optimize, or help in optimizing fluid flow through the wellbore 104. As described above, the downhole-type artificial lift system 124 creates a pressure differential within the well 102, for example, particularly within the wellbore 104 where the artificial lift system 124 resides. In some instances, a pressure at the base of the wellbore 104 is a low pressure (e.g., sub-atmospheric); so unassisted fluid flow in the wellbore can be slow or stagnant. In these and other instances, the downhole-type artificial lift system 124 introduced to the wellbore 104 adjacent the perforations 114 can reduce the pressure in the wellbore 104 near the perforations 114 to induce greater fluid flow from the subterranean zone 110, increase a temperature of the fluid entering the artificial lift system 124 to reduce condensation from limiting production, and increase a pressure in the wellbore 104 uphole of the artificial lift system 124 to increase fluid flow to the surface 106.

The artificial lift system 124 moves the fluid at a first pressure downhole of the blower to a second, higher pressure uphole of the artificial lift system 124. The artificial lift system 124 can operate at and maintain a pressure ratio across the artificial lift system 124 between the second, higher uphole pressure and the first, downhole pressure in the wellbore. The pressure ratio of the second pressure to the first pressure can also vary, for example, based on an operating speed of the artificial lift system 124, as described in more detail below.

The downhole-type artificial lift system can operate in a variety of downhole conditions of the wellbore 104. For example, the initial pressure within the wellbore 104 can vary based on the type of well, depth of the well 102, production flow from the perforations into the wellbore 104, and/or other factors.

In some implementations, a magnetic bearing controller and amplifier drive 150 for the downhole-type tool 136, shown as the downhole-type artificial lift system 124 in FIG. 1, is located topside to improve and/or maximize reliability and serviceability. A digital signal processor (DSP) based controller receives signals, such as position signals, from an axial generator, sensor, and/or sensor electronics within the downhole-type tool 136, and uses the signals for input as part of an algorithm to determine a property of the tool 136 (e.g., rotor position) and/or an environment about the tool 136. For example, the algorithm can include a position control algorithm to determine a longitudinal position and/or lateral position of the rotor of the tool 136, for example, relative to a longitudinal axis parallel to (substantially or exactly) the centerline of the wellbore 104. This algorithm output can include a current command to an amplifier to drive coils of the active magnetic bearings within the downhole-type artificial lift system 124, thus impacting a force on the rotor (details are explained in greater detail later within the disclosure). This loop can happen very fast, on the order of 1,000-20,000 times a second depending on the system control requirements. However, all or a portion of the control measurements can be measured at a lower rate. This control system is also capable of interpreting the bearing requirements to estimate forces and fluid pressures in the well. An analog circuit based controller can also perform this function. Having this DSP or analog circuit based controller topside allows for easy communication, service, and improved up time for the system, as any issues can be resolved immediately via local or remote support. Downhole electronics are also an option either proximate to the device or at a location more thermally suitable. In a downhole implementation, the electronics can be packaged to isolate them from direct contact with the downhole environment. Downhole electronics offer better control options since they don't suffer with long cable delay and response issues. In certain implementations, the one or more axial gap generators of the measurement tool 138 adjacent the rotor of the downhole-type tool 136 can operate to measure a physical property of the rotor or the environment surrounding the generator, and/or generate and supply power to the control coils of one or more magnetic bearings, for example, to reduce or remove the use of fragile downhole electronics to measure physical properties downhole and/or control the one or more magnetic bearings. Details of these implementations are explained in greater detail later.

Figure 2A:
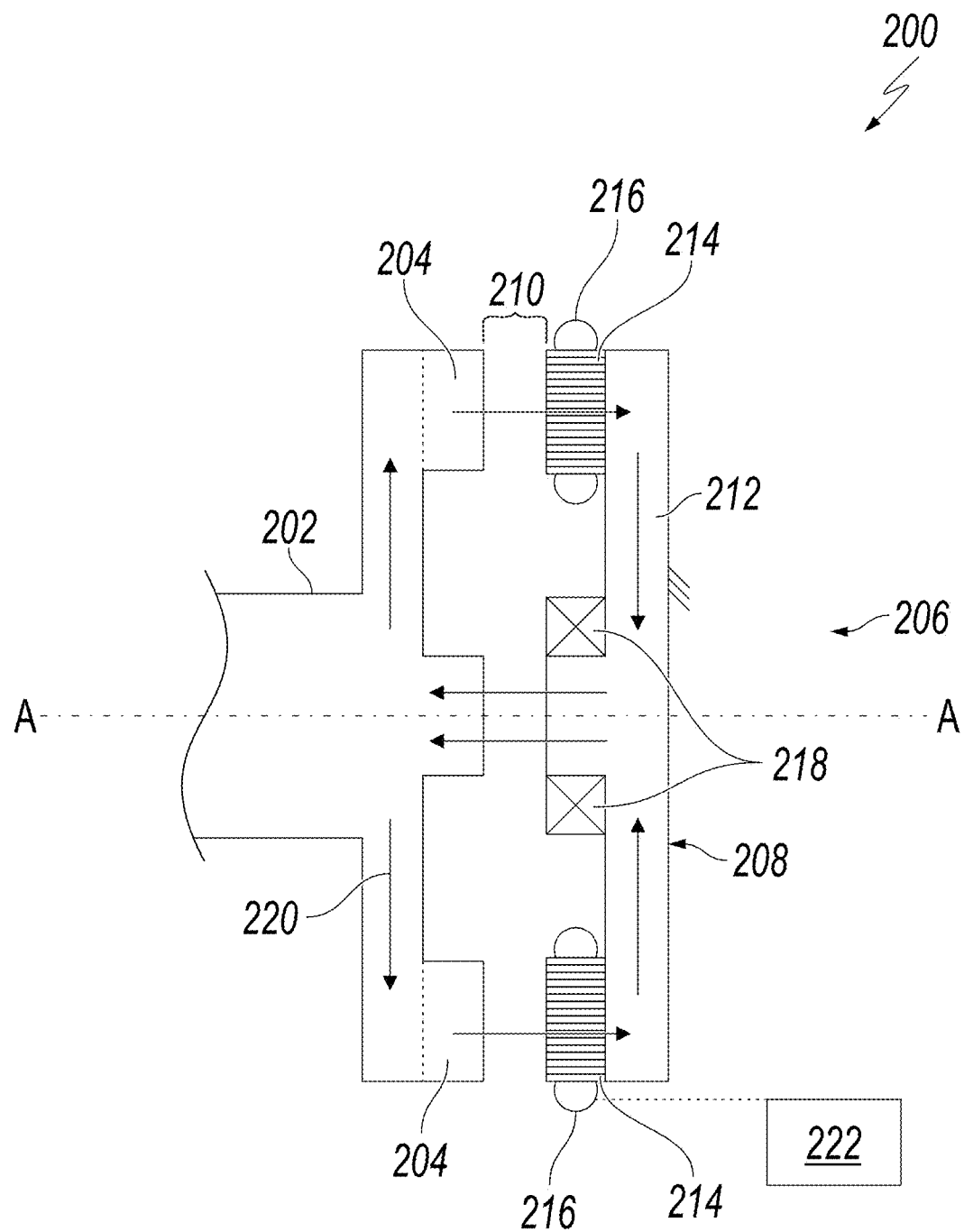
FIG. 2A is a schematic cross-sectional side view of an example measurement tool adjacent to a rotor.

FIG. 2A is a schematic cross-sectional side view of an example measurement tool 200 adjacent to a rotor 202. The example measurement tool 200 can be used in the measurement tool 138 of FIG. 1, and the rotor 202 can be the rotor of the downhole-type tool 136 of FIG. 1. The measurement tool 200 measures an axial position of the rotor 202, for example, along a longitudinal axis A-A about which the rotor 202 is configured to rotate. The measurement tool 200 includes an axial gap generator 206 including a stator assembly 208 that is sensitive to an axial gap 210 between the rotor 202 and the stator assembly 208, and parallel to the longitudinal axis A-A. During operation of a tool (e.g., a downhole-type tool) that rotates the rotor 202, the measurement tool 200 can be used to measure an axial position of the rotor 202 as the rotor 202 rotates about the longitudinal axis A-A and as the rotor 202 is displaced along the longitudinal axis A-A, for example, in response to fluctuations in an environment surrounding the tool, fluctuations in an operation of the tool, and/or other factors.

The axial gap generator 206 generates an electrical signal (e.g., voltage signal) as a function of the gap spacing 210 between the stator assembly 208 and the rotor 202, where the gap spacing is parallel to the longitudinal axis A-A. The size of the axial gap spacing 210 determines the voltage signal output of the axial gap generator 206. In some instances, the voltage signal output is a back electromotive force output of the axial gap generator 206. The axial gap generator 206 varies the voltage signal output reflective of a variance in the gap spacing 210, for example, in response to a displacement of the rotor 202 relative to the stator assembly 208 and parallel to the longitudinal axis A-A. For example, when the rotor 202, the stator assembly 208, or both the rotor 202 and the stator assembly 208 moves relative to one another with respect to the longitudinal axis A-A, the gap spacing 210 between the rotor 202 and the stator assembly 208 changes, and a flux across the gap spacing 210 reaching the stator assembly 208 changes; thus the axial gap generator 206 produces a different voltage signal output as the gap spacing 210 varies. In some examples, the stator assembly 208 is mounted to a housing or other fixed structure, while the rotor 202 is designed to longitudinally displace to some degree (for example, up to the size of the gap spacing 210) during operation. The axial gap generator 206 can determine the longitudinal position of the rotor 202 because the voltage signal is reflective of the gap spacing 210 between the rotor 202 and the fixed-position stator assembly 208. As an example, the axial gap generator 206 can generate a voltage signal output of 100 volts alternating current (VAC) when the axial gap spacing 210 is 1 millimeter (mm), while the generator 206 can generator a voltage signal output of 200 VAC when the axial gap spacing 210 is 0.5 mm. While the axial gap generator 206 can have a voltage signal output that is linearly proportional to a size of the gap spacing 210, the voltage signal output can also be non-linearly proportional to the size of gap spacing.

In the example measurement tool 200 of FIG. 2A, the stator assembly 208 includes a stator back structure 212, a set of stator poles 214, and a set of stator coils 216 surrounding each stator pole 214 in the set of stator poles 214. The axial gap generator 206 generates the voltage signal as a function of the gap spacing 210 between the stator assembly 208 and the rotor 202, for example, between the set of stator poles 214 and rotor poles 204 of the rotor 202. The example stator assembly 208 also includes a magnetic field source in the form of a field coil 218, where the axial gap generator 206 is an electromagnetic-type generator. The field coil 218 can be connected to a local power source or other power source to provide a current to the axial gap generator 206. In some embodiments, the axial gap generator 206 is a permanent magnet-type generator, where the field source includes a permanent magnet, for example, instead of the electromagnetic field coils 218. In permanent magnet-type embodiments, a power source is not needed, as the permanent magnet provides a magnetic field source that does not require a current from a power source to energize the axial gap generator. In some examples, the permanent magnet can be mounted to or integral with the rotor 202. During operation of a device that rotates the rotor 202, the magnetic field source (e.g., the energized field coil 218 or a permanent magnet) generates a magnetic field path (indicated in FIG. 2A with arrows 220) and a magnetic flux proportional to a current (I) applied to the field coil 218, a number of turns (N) on the field coil 218 (where magnetomotive force, or mmf, is equal to N×I), and the reluctance of the magnetic field path. The materials of the stator back structure 212, the rotor 202, or both can be chosen to reduce its influence on the reluctance of the magnetic field path. For example, the stator back structure 212 and/or the rotor 202 can be comprised of iron because of iron's high magnetic permeability (e.g., v2000). However, the material of the rotor 202 and/or the stator back structure 212 can be different. In some examples, the reluctance of the flux path through the stator back structure 212 is very low in relation to the reluctance across the gap spacing 210 because of the low permeability of any fluid in the gap spacing (e.g., µ=1 for air). Magnetic flux is equal to mmf over reluctance (or, mmf/reluctance), so an amount of flux reaching the stator coils 216 is substantially influenced by the gap spacing 210. As the rotor 202 moves longitudinally (i.e., axially along longitudinal axis A-A), the reluctance of the magnetic field path changes, thus changing the flux seen by the stator coils 216. The voltage signal output from the axial gap generator 206, in particular, the stator coils 216, is dependent on the rotational speed of the rotor 202 and the flux. At a fixed rotational speed of the rotor 202, the voltage signal output of the axial gap generator 206 is primarily reflective of the gap spacing 210 between the rotor 202 and the stator assembly 208, so the voltage signal output is representative of the axial position of the rotor 202 relative to the stator assembly 208. In instances where the stator assembly 208 is in a fixed or known axial position, the voltage signal output from the axial gap generator 206 provides an axial position of the rotor 202.

Figure 2B:
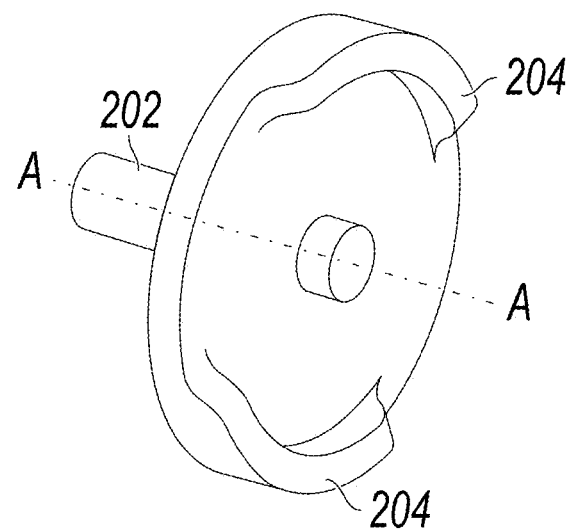
FIGS. 2B and 2C are isometric views of an example rotor, and of an example rotor and example measurement tool, respectively.
Figure 2C:
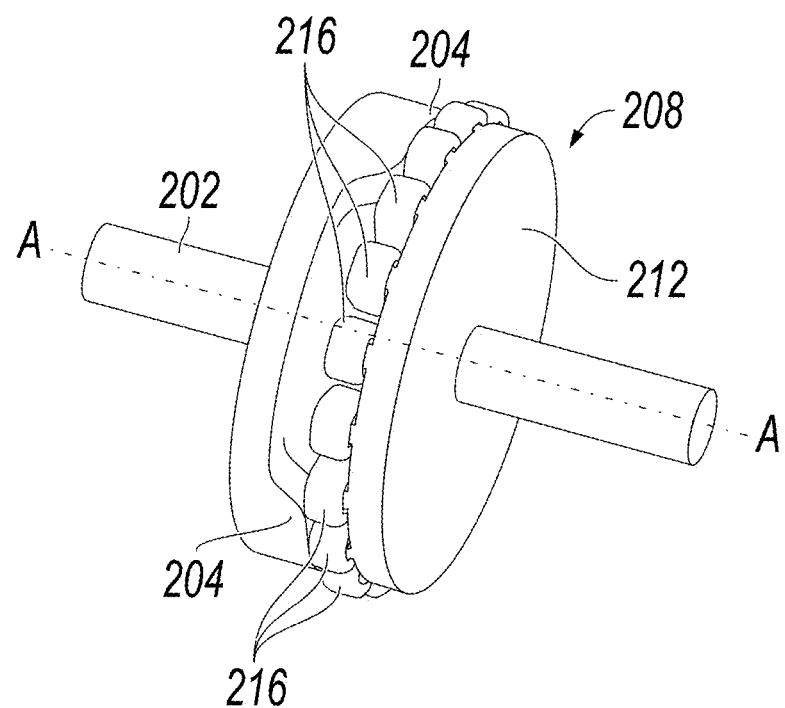

FIGS. 2B and 2C are isometric views of the example rotor 202, and of the example rotor 202 and example measurement tool 200, respectively. Referring to the example rotor 202 and example measurement tool 200 of FIGS. 2A-2C, the rotor 202 includes a two-pole structure including two rotor poles 204 spaced opposite each other on a cylindrical, flanged longitudinal end of the rotor 202. The rotor poles 204 can be integral to the structure of the rotor 202, and are shown as extending from the longitudinal end of the rotor 202 across from the stator poles 214 of the stator assembly 208. In some instances, a different (e.g., greater) number of rotor poles 202 can be used, for example, two, four, six, or more poles can be provided on the rotor 202. In some instances, rotor poles with side ends of a shorter or longer angular length than the rotor poles 202 shown in FIGS. 2B and 2C can be used, for example, rotor poles with side ends having an angular length of 30 degrees (°), 45°, 60°, or 90°, or can be provided on the rotor 202. As the rotor 202 rotates, the rotor poles 204 create small axial gap areas (e.g., gap spacing 210) and large axial gap areas between the rotor 202 and the stator assembly 208 corresponding to where the rotor poles 202 extend from the end of the rotor 202 and do not extend from the rotor 202, respectively. The magnetic flux pathway crosses from rotor pole 204 to stator assembly 208 across the small gap areas (e.g., across gap spacing 210).

In some instances, the stator assembly 208 is a slotted, laminated soft iron for the high frequency magnetic field. For example, the stator assembly 208 of FIGS. 2A and 2C include individual stator poles 214 extending longitudinally from the stator back structure 212 with stator coils 216 wrapped around each stator pole 214. In some examples, the stator assembly includes a tape-wound laminated core with slots and a subsequent distributed winding (e.g., coils wrapping between slots). Laminations can minimize eddy current generation that would reduce the magnetic field being seen by the stator coils 216 for voltage signal output generation. An isolation can or seal (not shown) can be used in the gap spacing 210, for example, to prevent or reduce infiltration of materials (e.g., fluids) from affecting operation of the axial gap generator 206.

The axial gap generator 206 is shown in FIGS. 2A-2C as positioned at the longitudinal end of the rotor 202, where the stator assembly 208 is positioned adjacent to but spaced slightly apart from the longitudinal end of the rotor 202. In particular, the rotor 202 includes a flanged end that protrudes radially from a central cylindrical portion of the rotor 202, and the flanged end includes and/or supports the rotor poles 204. In some implementations, the axial gap generator 206 can be positioned differently with respect to the rotor 202. For example, rotor 202 can include a disc-shaped protrusion extending radially outward from the rotor 202 where the central cylindrical portion of the rotor extends longitudinally from both sides of the disc-shaped protrusion, and the stator of the axial gap generator 206 is positioned adjacent to but spaced slightly apart from the disc-shaped protrusion of the rotor 202. The stator assembly of the axial gap generator can include an aperture through a center of the stator assembly through which the central cylindrical portion of the rotor 202 can pass through, for example, such that the axial gap generator can be positioned along an intermediate length of the rotor between a first longitudinal end and a second, opposite longitudinal end of the rotor. The portion of the rotor engaged with, integrated with, and/or passing through the axial gap generator can be integrated into another component of the rotating device, such as in the end of the motor rotor, thrust bearing, a pump impeller, a compressor wheel, or a turbine wheel, among other rotating device examples.

The stator assembly 208 of the example measurement tool 200 is mounted to a fixed structure with a known axial position. For example, the stator assembly 208 can be mounted to a housing of the measurement tool 200, a housing of the device supporting the rotor 202, or another structure. In some examples, the measurement tool 200 includes a housing that is integral with or mounted to a housing of the downhole-type tool 136 of FIG. 1. The stator assembly 208 is mounted to a fixed structure with a known position, for example, such that a voltage output signal from the axial gap generator 206 corresponding to the gap spacing between the stator assembly 208 and the rotor 202 is reflective of (e.g., a function of) an axial position of the rotor 202.

The measurement tool 200, specifically the axial gap generator 206, is communicably coupled to a controller 222 that receives the voltage signal output from the axial gap generator 206. The controller 222 receives the voltage signal output, and determines the axial position of the rotor 202 as a function of, or based on, the received voltage signal. The voltage signal output from the axial gap generator 206 can be affected by the operational speed of the rotor 202. In some implementations, an operating speed (e.g., rotational speed) of the rotor 202 is known, and the controller 222 can incorporate a speed compensation curve in its processing of the received voltage output signal to separate speed from the position signal. In certain implementations, the voltage signal output from the axial gap generator 206 is used to detect the speed of the rotor 202, for example, using the frequency of the voltage output signal (e.g., VAC) from the axial gap generator 206 since the frequency is directly proportional to operating speed. To determine an axial position of the rotor 202, a center (e.g., neutral) position of the rotor 202 and a corresponding output signal is established. For example, at a first, neutral position of the rotor 202, the axial gap generator 206 produces a first voltage output signal. In operation of the rotor 202 and the axial gap generator 206, a change in the voltage output signal relative of the first voltage output signal signifies a change in the axial position of the rotor 202 with respect to the first, neutral position. The first, neutral position of the rotor 202 and the first voltage output signal can be established with a calibration routine. For example, in an active magnetic bearing system, a calibration routine can include spinning the rotor 202 about its rotational axis (i.e., longitudinal axis A-A) and moving the rotor from a first extreme end (i.e., a maximum displacement in a first direction along the longitudinal axis A-A) to a second, opposite extreme end (i.e., a maximum displacement in a second direction opposite the first direction along the longitudinal axis A-A) to determine a mid-point of the rotor 202 between the first extreme end and the second extreme end. The mid-point of the rotor 202 is the mechanical center of the rotor 202 in relation to the voltage signal from the axial gap generator 206. The controller 222 can receive voltage signal outputs from the axial generator 206 during rotation of the rotor 202 at a range of frequencies. For example, in instances where a total axial movement of 1 mm is allowed for a rotor assembly, moving the rotor to a first extreme and a second, opposite extreme would allow the controller to determine a center position as 0.5 mm from either side. This movement range can be smaller or larger than 1 mm, but can be expected to be between 0.5 mm to 2 mm.

The axial gap generator 206 can connect to the controller 222 in a variety of ways, such as a wired connection. The controller 222 can be located locally, in other words, close to the axial gap generator 206. In some examples, the controller 222 is located remotely from the axial gap generator 206, such as at a tophole location in the well system 100 of FIG. 1. For example, the axial gap generator 206 can utilize a multi-conductor cable to carry a three-phase voltage signal from the axial gap generator to a tophole controller. This signal could also be generated by the axial gap generator as a single phase or two phase signal and carried on a single or multi-conductor cable. For example, the axial gap generator 206 can tap into a communication line of a variable speed drive (VSD) (e.g., VSD 140 of FIG. 1) extending from a remote location toward the measurement tool 200 to send the voltage signal output to the controller 222. In some examples, with reference to the well system 100 of FIG. 1, the controller 222 is part of the magnetic bearing controller and amplifier drive 150.

In some implementations, the measurement tool 200 can include a second axial gap generator with a second stator assembly and corresponding structures adjacent to the rotor 202. The second axial gap generator can produce a second voltage signal output as a function of a second gap spacing between the second stator assembly and a rotor (e.g., rotor 202) parallel to the longitudinal axis A-A. The second gap generator and second stator assembly can be incorporated into the first stator assembly but configured to output a second voltage signal, or the second gap generator can be positioned separately from the first axial generator 206, for example, but adjacent to a different portion of the rotor 202. In some implementations, the voltage signal output from the axial gap generator 206 and the second voltage signal output from the second axial gap generator can be combined to provide a single voltage signal proportional to the respective gap spacings and reflective of the axial position of the rotor 202. For example, as the first gap spacing 210 on the first axial gap generator 206 is decreased due to rotor 202 displacement, thus increasing its voltage output signal, the second gap spacing between the second axial gap generator and the rotor 202 increases, thus reducing the second voltage output signal from the second gap generator. Putting these two waveforms (i.e., voltage signals) out of phase from each other can increase the sensitivity of the position measurement (e.g., by two-times sensitivity), where in an instance when the rotor 202 is centered, both waveforms are of equal magnitude and as the gap spacings change, the two phases increase and/or reduce proportionally to the change in rotor 202 position. The second axial gap generator can act as a redundant generator to generator 206. The second axial gap generator can share the same rotor 204, using a back, or opposite side of the rotor 202 in relation to the stator back structure 212, or can utilize its own rotor and stator assembly near or distant form the first axial gap generator 206. In some implementations, a second axial gap generator can act to average position control in a long shaft. Placing a second axial gap generator in a different location from a first axial gap generator to measure position allows an averaging of the position measurements. For example, if a long rotor with many axial components are needed to be controlled axially, one position sensor on one end may not adequately control the far end components. Placing a second axial gap generator at the far end of the rotor and combining the two readings will allow for averaging, for example, reducing inaccuracy in position readings across a rotor where one end sees a displacement that is different from the opposite end. This can occur due to differential thermal growth of components, where the rotor grows axially different than the stator as it changes temperature. The second voltage signal can be in phase or out of phase (e.g., 180 degrees out of phase) with the voltage signal of the axial generator 206, and can be of the same polarity or opposite polarity as the voltage signal of the axial generator 206.

Figure 3:
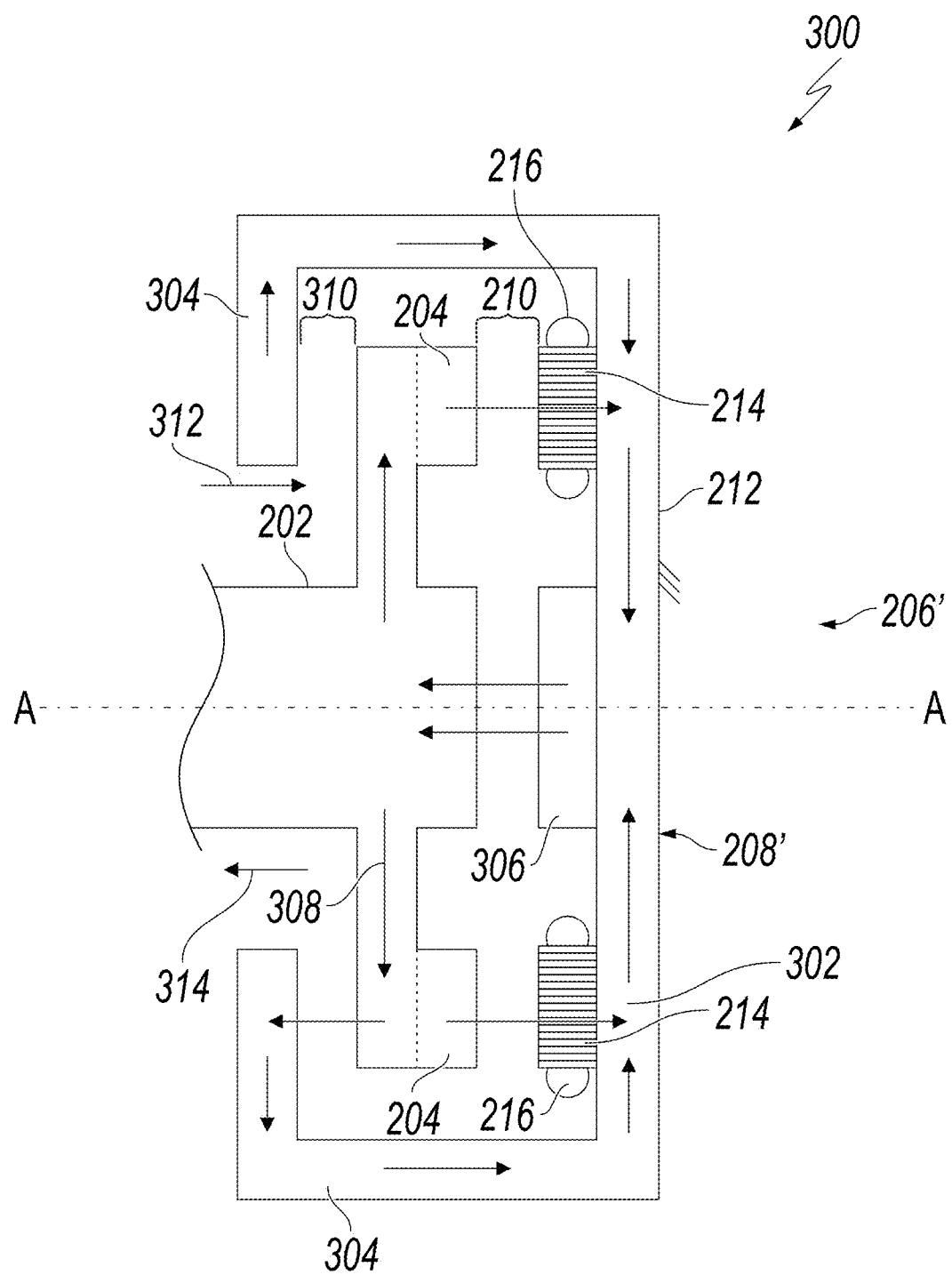
FIG. 3 is a schematic cross-sectional side view of an example measurement tool adjacent to a rotor.

The stator assembly 208 can take a variety of other forms. For example, FIG. 3 is a schematic cross-sectional side view of an example measurement tool 300 adjacent to the rotor 202 of FIG. 2A, where the example measurement tool 300 is like the measurement tool 200 of FIG. 2A except the stator assembly 208' of the axial gap generator 206' has a first stator portion 302 adjacent the rotor 202 and a second stator portion 304 that extends radially outward and around the flanged longitudinal end of the rotor 202. In addition, the magnetic field source is a permanent magnet 306, for example, instead of energized electromagnetic field coils. FIG. 3 shows the permanent magnet 306 as attached to or integral with the stator assembly 208'. In some implementations, the permanent magnet 306 can be attached to the rotor 202, instead. In the example magnetic tool 300, the axial gap generator 206' generates a voltage signal as a function of the gap spacing 210 (i.e., a first gap spacing) between the first stator portion 302 of the stator assembly 208' and the rotor 202 on a first side of the rotor 202, and as a function of a second gap spacing 310 between the second portion 304 of the stator assembly 208' and the rotor 202 on a second side of the rotor 202 opposite the first side. The second gap spacing 310 can be the same size or slightly greater than the gap spacing 210 when the rotor 202 is in its first, neutral position.

During operation of a device that rotates the rotor 202, the magnetic field source generates the magnetic field path indicated in FIG. 3 with arrows 308. The magnetic field path 308 includes the magnetic field path 220 of FIG. 2A crossing the axial gap spacing 210 to the first stator portion 302 of the stator 208', and also includes a second magnetic field path section that crosses the second gap spacing 310 on the second side of the rotor 202 through the second stator portion 304 of the stator assembly 208'. This second path section does not generate a voltage in the stator coils 216 because it does not pass through the stator poles 214. During operation and rotation of the rotor 202, the magnetic field path 308 favors the path with the smaller of the two axial gap spacings 210 or 310. For example, as the rotor 202 moves closer to the first stator portion 302 of the stator assembly 208' in a first direction 312 (i.e., in a direction from the first side of the rotor 202 toward the first stator portion 302), the first axial gap 210 becomes smaller and the second axial gap 310 becomes larger, biasing more magnetic field to move across the first gap spacing 210 than the second gap spacing 310. On the other hand, as the rotor 202 moves closer to the second stator portion 304 of the stator assembly 208' in a second direction 314 (i.e., in a direction from the second side of the rotor 202 toward the L-shaped second stator portion 304) opposite the first direction 312, the second axial gap 310 becomes smaller and the first axial gap 210 becomes larger, biasing more magnetic field to move across the second gap spacing 310 than the first gap spacing 210. Since the second path of the magnetic field path 308 does not generate a voltage on the stator coils 216, the stator coils 216 experience a more significant field loss from axial position changes in the second direction 314 (relative to the first, neutral position of the rotor 202). This arrangement of the stator assembly 208' can make the axial gap generator 206' more sensitive to axial position of the rotor 202, in that the voltage signal output from the axial gap generator 206' is more sensitive to the axial position of the rotor 202. Said differently, the amount of flux reaching the stator coils 216 determines the voltage output signal, but the flux reaching the stator coils 216 is influenced by both the first gap spacing 210 and the second gap spacing 310.

As described earlier, the axial gap generator 206 of FIG. 2A can be mounted to a variety of surfaces. With respect to FIG. 2A, the stator assembly 208 of the axial gap generator 206 is shown as mounted to a fixed surface, such as a housing or other structure at a known position. However, in some implementations, the stator assembly 208 can be mounted, partially or completely, on a movable support structure that is configured to move all or a portion of the stator assembly 208 parallel to the longitudinal axis A-A based at least in part on a physical property of an environment about the movable support structure. The movable support structure can move in response to a physical property and change the gap spacing 210 such that the voltage signal output from the axial gap generator 206 can be used to measure the physical property. The movable support structure can move the stator assembly 208 a displacement equal to the entirety of the size of the gap spacing 210; however, the displacement of the stator assembly 208 need not be that large to effect a noticeable gap spacing change through the voltage signal output. For example, the movable support structure can move the stator assembly 208 and change the gap spacing 210 by 20% or less, while still being effective in that the voltage signal output can adequately represent the axial gap spacing 210 and its size changes relative to an initial spacing size.

Figure 4B:
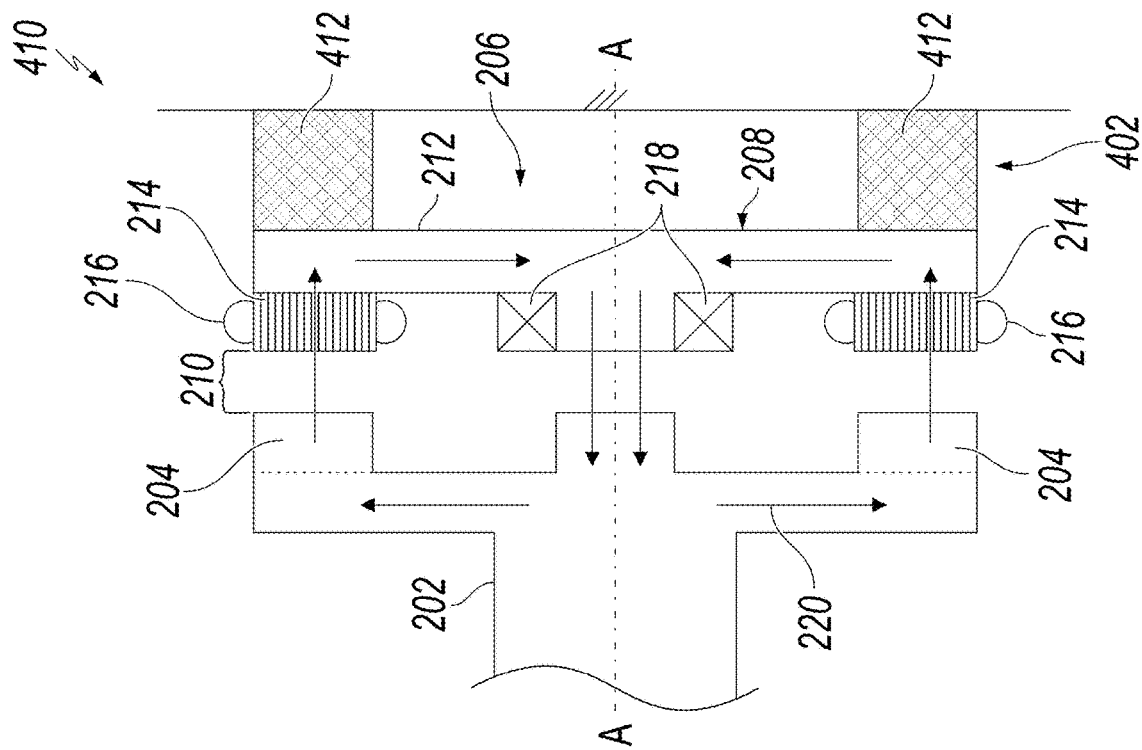
FIGS. 4A-4D are schematic cross-sectional side views of example measurement tools adjacent to a rotor.
Figure 4A:
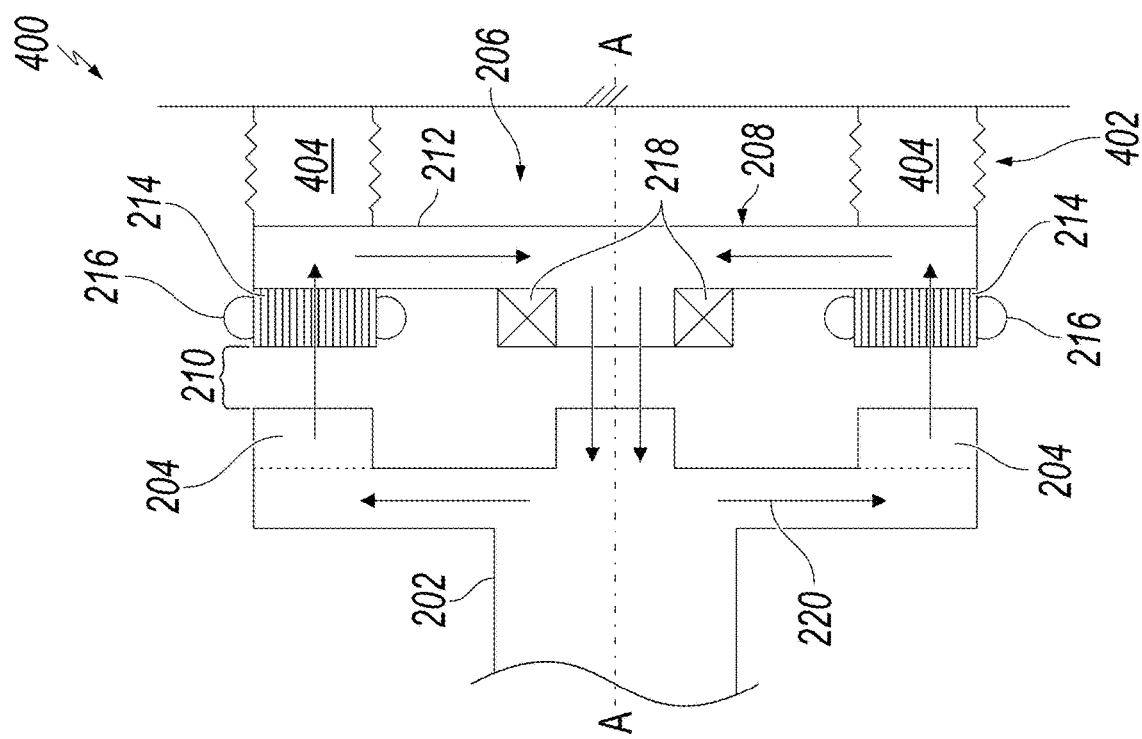

For example, FIG. 4A is a schematic cross-sectional side view of an example measurement tool 400 adjacent to the rotor 202 of FIG. 2A, where the example measurement tool 400 is like the measurement tool 200 of FIG. 2A except the stator assembly 208 is mounted to a movable support structure 402. In particular, the movable support structure 402 attaches to the stator assembly 208 on a first side of the movable support structure 402, and attaches to a support surface on a second side of the movable support structure 402 opposite the first side. The support surface can be a fixed structure, such as the housing of the measurement tool 400 or another fixed device with a known axial position along the longitudinal axis A-A. As the movable support structure 402 moves (e.g., flexes, expands, or contracts) in a direction parallel to the longitudinal axis A-A in response to a physical property (e.g., pressure, temperature, or other) of the environment around the movable support structure 402, the position of the stator assembly 208 changes, thus changing the size of the gap spacing 210 and ultimately changing the voltage signal output of the axial gap generator 206. Since the voltage signal output from the axial gap generator 206 depends at least partially on the operating speed of the rotor 202 and the axial position of the rotor, the voltage signal output is filtered to compensate for the operating speed and the axial position. In some implementations, the controller 222 performs this filtering to determine a measurement of the physical property that the movable support structure 402 is sensitive to.

The movable support structure 402 can take a variety of forms, and can include a flexible material, expandable material, compressible material, and/or other materials that allow relative movement between a first end of the movable support structure 402 and a second, opposite end of the movable support structure 402. For example, the example measurement tool 400 of FIG. 4A shows the movable support structure 402 as including a diaphragm 404, or a bladder. The diaphragm 404 is sensitive to pressure, and can move (e.g., expand or contract) in a direction parallel to the longitudinal axis A-A when a pressure internal to the diaphragm 404 is different from an external pressure external to the diaphragm 404. The diaphragm 404 has an initial internal pressure at a reference state. As the external pressure changes, the diaphragm 404 compresses or expands until the internal pressure within the diaphragm 404 matches the external pressure. For example, if an initial internal pressure of the diaphragm 404 is 15 psi and the external pressure increases to 100 psi (e.g., during operation of the rotor 202), the diaphragm 404 compresses until the internal pressure is 100 psi to match the external pressure. In this example, a compression of the diaphragm 404 increases the size of the gap spacing 210, thus changing the voltage signal output of the axial gap generator 206. In another example, as an external pressure decreases below a first internal pressure of the diaphragm 404, the diaphragm 404 expands until the internal pressure substantially or exactly matches the external pressure. This example expansion of the diaphragm 404 decreases the size of the gap spacing 210, thus changing the voltage signal output of the axial gap generator 206.

While FIG. 4A shows the movable support structure 402 as attached to a side of the stator assembly 208 opposite the rotor 202, the shape and location of the movable support structure 402 can be different. In some implementations, the movable support structure 402 can be attached to the side of the stator assembly 208 adjacent to the rotor 202. For example, the stator back support 212 can extend radially outward such that the movable support structure 402 attaches to the rotor back structure 212 and extends in the second direction 314 to further attach to a fixed surface, such as a portion of a housing.

The movable support structure 402 of FIG. 4A is shown as a ring-shaped diaphragm 404 that attaches to the stator assembly 208 at a radially outward portion of the stator back structure 214. However, the movable support structure 402 can include a single movable support structure 402 attaching to all or a portion of the stator back structure 212, can include one or more movable support structures 402 dispersed about the stator assembly 208, or can take another form.

In some examples, the movable support structure 402 includes a temperature responsive material. FIG. 4B shows an example measurement tool 410 similar to the example measurement tool 400 of FIG. 4A, except the movable support structure 402 includes a temperature responsive material 412. The temperature responsive material 412 is sensitive to temperature, and can move (e.g., expand or contract) in a direction parallel to the longitudinal axis A-A when a temperature of the environment surrounding the temperature sensitive material 412 changes.

The temperature sensitive material 412 has an initial position at an initial reference state, and expands or contracts with the temperature of the environment surrounding the temperature responsive material 412. The temperature responsive material 412 can take a variety of forms. For example, the temperature responsive material 412 can include a thermoplastic, acrylic, Teflon™, a combination of these, or another material sensitive to temperature. The temperature responsive material 412 is more responsive to temperature than the surrounding materials of the stator assembly 208 and/or rotor 202, for example such that the temperature responsive material 412 sufficiently displaces the stator assembly 208 a noticeable amount to effect a change in voltage output. In some instances, the temperature responsive material 412 can expand or contract at a rate significantly greater than two times the rate of surrounding material of the stator assembly 208. The stator assembly 208 can have a reference axial position with a corresponding reference temperature of the temperature responsive material 412, where a temperature of the environment greater than or less than the reference temperature causes the temperature responsive material 412 to expand or contract along a direction parallel to the longitudinal axis, changing a size of the gap spacing 210 and subsequently changing the voltage signal output of the axial gap generator 206. For example, at a first reference temperature of 20° Celsius of the temperature responsive material 412, the axial position of the stator assembly 208 can be at a reference, neutral position that produces a reference voltage signal output. When the temperature of the environment surrounding the temperature responsive material 412 changes, such as increases to 200° Celsius, an expansion rate of the temperature responsive material 412 moves the stator assembly 208 relative to the rotor 202 to reduce the gap spacing 210, resulting in a higher voltage signal output. The increased voltage signal output can then be used to determine the effective temperature of the temperature responsive material 412, the stator assembly 208, itself, and/or the environment surrounding the temperature responsive material 412.

All or a portion of the stator back structure 212 can attach to the movable support structure 402 to allow one or more or all of the stator coils 216 to move with the movable support structure 402 and subsequently change a gap spacing between the respective stator coils 216 and the rotor 202.

Figure 4C:
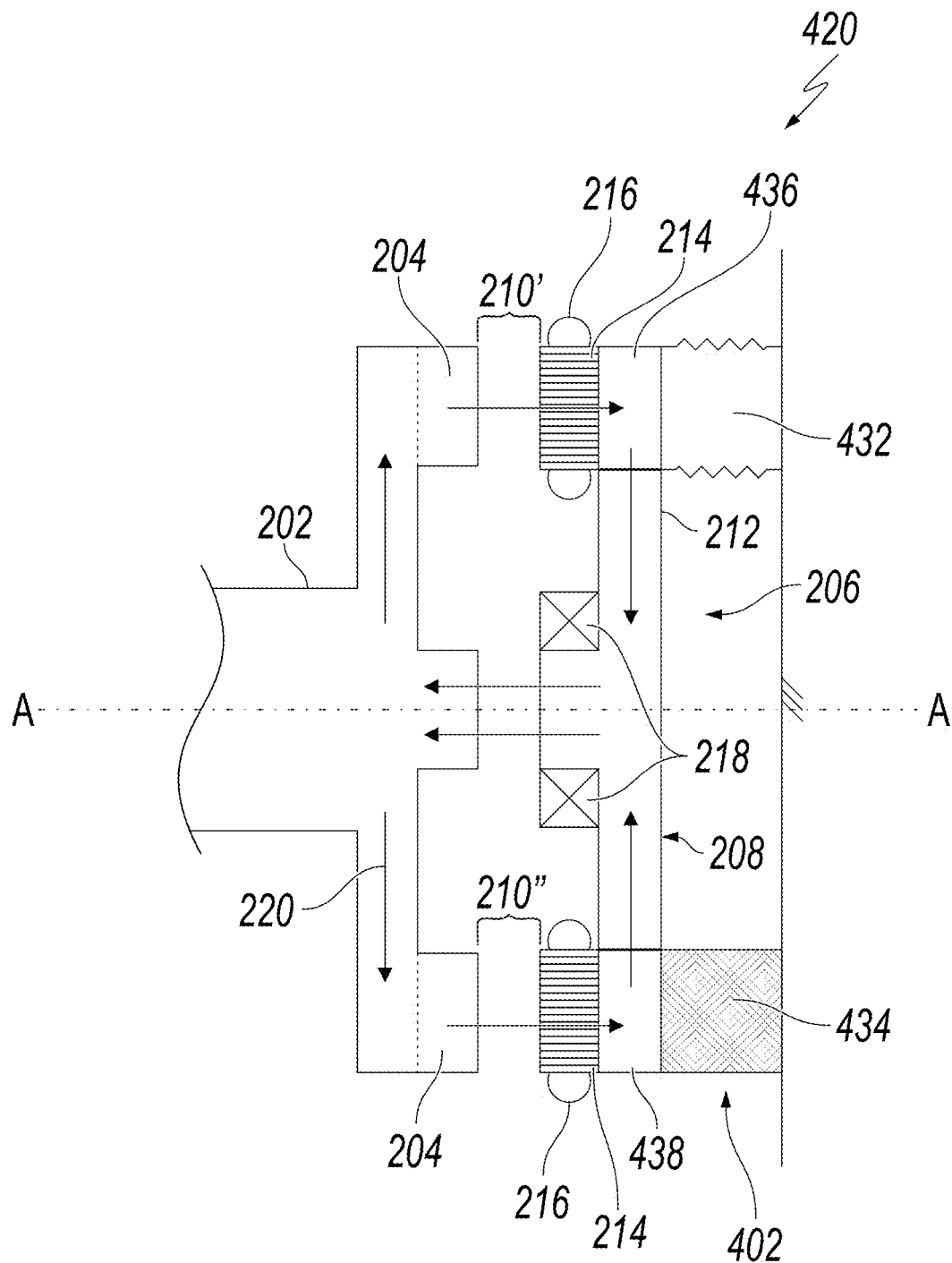

In some instances, a first portion of the stator coils 216 can be configured to move independently from a second portion of the stator coils 216, effectively functioning as two axial gap generators that present two different voltage signal outputs. For example, the movable support structure 402 can include two or more separate structures, each of the structures corresponding to a subset of the stator coils 216 and configured to move independently of each other. Each separate structure of the movable support structure 402 can attach to a respective set of the stator coils 216. FIG. 4C is a schematic cross-sectional side view of an example measurement tool 420 similar to the example measurement tool 400 of FIG. 4A, except the movable support structure 402 includes a diaphragm 422 corresponding to a first subset of the stator coils 216 and a temperature responsive material 424 corresponding to a second subset of the stator coils 216. The diaphragm 422 can be like the diaphragm 404 of FIG. 4A, and the temperature responsive material 424 can be like the temperature responsive material 412 of FIG. 4B. The measurement tool 420 incorporates both the diaphragm 422 and the temperature responsive material 424 such that the stator assembly 208 is configured to provide voltage signal output reflective of the pressure and/or temperature of the environment surrounding the stator assembly 208.

In some implementations, a subset of the stator coils 216 is mounted on a longitudinally-sliding portion of the stator back structure 212, for example, such that the subset of stator coils 216 longitudinally moves along with the movable support structure 402 to adjust a gap spacing between the rotor 202 and the subset of stator coils 216. For example, FIG. 4C shows the first subset of stator coils 216 mounted on a first longitudinally sliding portion 436 of the stator back structure 212 and the second subset of stator coils 216 mounted on a second longitudinally sliding portion 438 of the stator back structure 212. The first subset of stator coils 216 moves with the axial movement of the diaphragm 422 to create a first gap spacing 210', and the second set of stator coils 216 moves with the axial movement of the temperature responsive material 424 to create a second gap spacing 210".

Figure 4D:
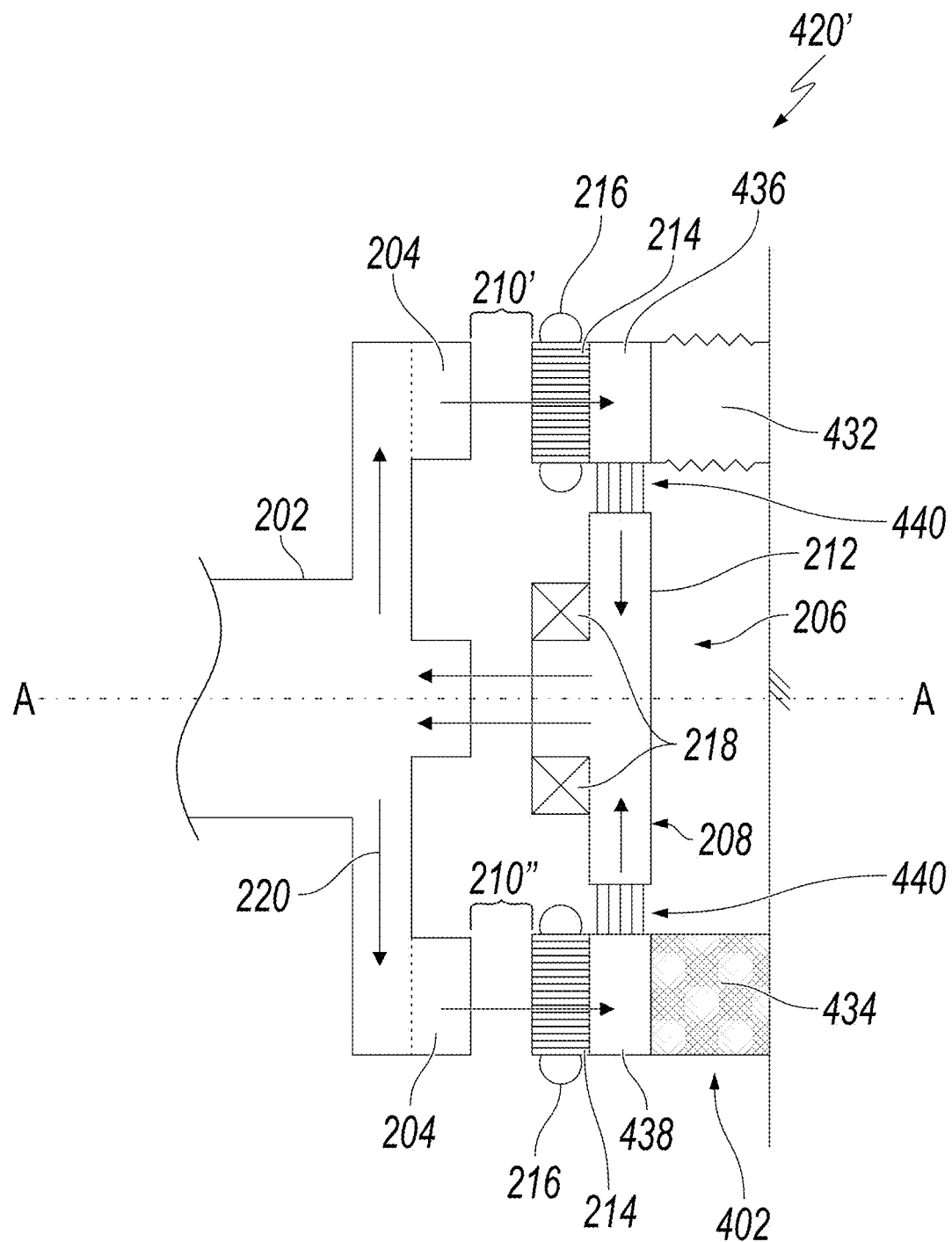

The longitudinally sliding portions 436 and 438 are connected to a fixed central portion of the stator back structure 212 with a sliding or guided support that allows longitudinal movement of the sliding portions 436 and 438. For example, the longitudinal sliding portions 436 and 438 can each attach to the stator back structure 212 with a T-shaped pin and slot connection, where a T-shaped pin on the sliding portion or on the fixed portion of the stator back structure 212 slidably fits within a corresponding T-shaped slot in the other of the fixed portion of the stator back structure 212 or the sliding portion. This T-shaped pin-and-slot connection allows guided movement of the sliding portion 436 and/or sliding portion 438 in an axial direction (i.e., parallel to longitudinal axis A-A) while fixing the sliding portion 436 and/or sliding portion 438 in a radial direction perpendicular to the axial direction. This arrangement allows the stator coils 216 mounted on the respective sliding portions to maintain a radial position with respect to the rotor 202 while allowing longitudinal movement of the stator coils 216 to affect the gap spacing and corresponding voltage signal output. In some examples, one or more of the sliding portions 436 and/or 438 can attach to the stator back structure 212 with a flexible web interface. For example, FIG. 4D is a schematic cross-sectional side view of an example measurement tool 420' incorporating a flexible web interface 440. The example measurement tool 420' is the same as the example measurement tool 420 of FIG. 4C, except the measurement tool 420' includes the flexible web interface 440 between the stator back structure 212 and the respective longitudinal sliding portions 436 and 438. As shown in FIG. 4D, the longitudinal portions 436 and 438 can each attach to the stator back structure 212 with the flexible web interface 440 (e.g., made up of a plurality of axially spaced thin layers of material extending circumferentially from the stator back structure 212), where the flexible web interface 440 connects to the respective longitudinally sliding portion 436 or 438 on a first end of the flexible web interface 440 and to the stator back structure 212 on a second, opposite end of the flexible web interface 440. This flexible web interface 440 allows movement, by deflection of the web, of the sliding portion 436 and/or sliding portion 438 in an axial direction (i.e., parallel to longitudinal axis A-A) while holding the sliding portion 436 and/or sliding portion 438 in a radial direction perpendicular to the axial direction. This arrangement allows the stator coils 216 mounted on the respective sliding portions to maintain a radial position with respect to the rotor 202 while allowing longitudinal movement of the stator coils 216 to affect the gap spacing and corresponding voltage signal output.

FIGS. 4C and 4D show the measurement tool 420 or 420' with the movable support structure 402 as including a diaphragm 422 and a temperature responsive material 424 distributed on opposite sides of the stator assembly 208. The number, type, and position of structures within the movable support structure 402 can be different. In some implementations, the stator assembly 208 includes a subset of stator coils intended to be fixed to a housing or device of the measurement tool (e.g., like the stator coils 216 of FIG. 2A). For example, a measurement tool can include a stator assembly with a first stator portion, a second stator portion, and a third stator portion, where each stator portion represents its own axial gap generator configured to measure a gap spacing between the rotor and the respective stator portions. Each stator portion can incorporate features from the position-sensitive, pressure-sensitive, and temperature-sensitive stator assembly configurations from the measurement tools of FIGS. 2A-4D. In some examples, the first stator portion can be fixed to a housing, device, or other fixed structure with a known longitudinal position, where the first stator portion measures a first axial gap between the first stator portion and the rotor to generate a first voltage signal reflective of an axial position of the rotor. The second stator portion can be fixed to a pressure-sensitive movable support structure (e.g., diaphragm), where the second stator portion measures a second axial gap between the second stator portion and the rotor to generator a second voltage signal reflective of a pressure of the environment about the second stator portion. The third stator portion can be fixed to a temperature-sensitive movable support structure (e.g., a temperature-responsive material), where the third stator portion measures a third axial gap between the third stator portion and the rotor to generate a third voltage signal reflective of a temperature of the environment about the third stator portion. The stator assembly is split into three effective stator structures working off the same rotor to generate three voltage signals that are functions of respective gap spacings between the rotor and the respective stator structures, and a controller (e.g., controller 222) can receive these three voltage signals to determine one or more or all of a longitudinal position of the rotor, a pressure about the rotor and/or stator assembly, and a temperature about the rotor and/or stator assembly. While the example stator assembly is described above as having three axial gap generators, a different number of stator structures, or axial gap generators, can be implemented.

While FIGS. 2A to 4B show one or two generator assemblies adjacent a rotor element, a different number of generator assemblies and/or rotor elements can be utilized. For example, multiple generator assemblies with multiple rotors and/or rotor elements (e.g., rotor poles) can be incorporated into a single tool or multiple tools. For example, a downhole-type tool with a single shaft can incorporate one, two, three, or more axial gap generator assemblies and one, two, three, or more rotor poles on a single shaft of the downhole-type tool. Multiple generator assemblies can be incorporated for reliability, redundancy in downhole and/or remote measurements, or other benefits.

Figure 5:
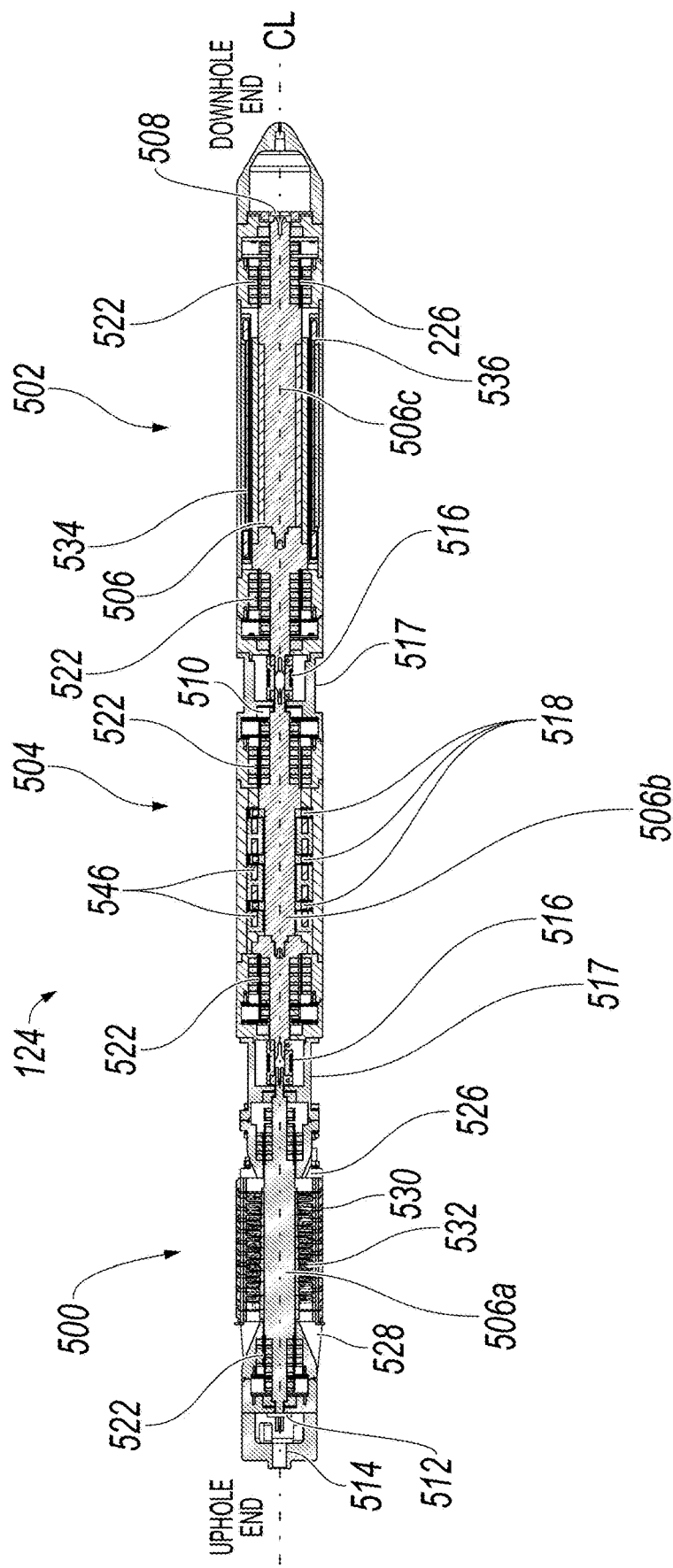
FIG. 5 is a schematic side half cross-sectional view of an example downhole-type artificial lift system.

As described earlier, the downhole-type tool 136 with the measurement tool 138 can take various forms, such as the downhole artificial lift system 124 of FIG. 1. FIG. 5 is a half side cross-sectional view of the example downhole-type artificial lift system 124 of FIG. 1. Referring to both FIGS. 1 and 5, the example downhole-type artificial lift system 124 includes a fluid-end 500, an electric machine 502, and a thrust bearing module 504. The electric machine 502, the thrust bearing module 504, and the fluid-end 500 are all coupled together on a central shaft 506 or rotor, but the central shaft 506 can instead be segmented, for example, separated into multiple rotor sections joined at longitudinal ends of each section with a coupling or other structure, described later. The artificial lift system 124 can incorporate one or more measurement tools, such as one or more of the measurement tools (200, 300, 400, 410, 420, 420') of FIGS. 2A-4D, to interact with the central rotor 506 and measure an axial position of the rotor, an environmental temperature, and/or an environmental pressure. For example, FIG. 5 shows a first measurement tool 508 at a downhole end of the central rotor 506 within the electric machine 502, a second measurement tool 510 proximate to the central rotor 506 at the thrust bearing module 504, and a third measurement tool 512 proximate to the central rotor 506 at the fluid-end 500. Each of the first measurement tool 508, the second measurement tool 510, and the third measurement tool 512 can be used to measure one or more of an axial position of the central rotor 506, a temperature of an environment surrounding the respective measurement tool, and/or a pressure of the environment surrounding the respective measurement tool. While FIG. 5 shows the artificial lift system 124 as incorporating three measurement tools, the artificial lift system 124 can include a different number of measurement tools (e.g., 1, 2, 4, or more) positioned at any position along the central rotor 506.

In the context of this disclosure, an uphole end or direction is an end nearer or moving in a direction towards the terranean surface 106. A downhole end or direction is an end nearer of moving in a direction away from the terranean surface 106. A coupling 514 is positioned at an uphole end of the fluid-end 500. The coupling 514 can be of a type used for a wireline connection, a tubing connection, or any other connection configured to support the weight of the downhole-type artificial lift system. The coupling 514 can include a standard attachment method to attach the downhole-type artificial lift system to a support system. For example, a threaded interface can be used for a sucker rod, or a set of bolts can be used to attach two flanges together for production tubing.

In the example artificial lift system 124 of FIG. 5, the electric machine 502 is positioned downhole of the fluid-end 500, and the thrust bearing module 504 residing between the electric machine 502 and the fluid-end 500. In some instances, the fluid-end 500, the thrust bearing module 504, and the electric machine 502 can be assembled in a different order. For example, the thrust bearing module 504 can be positioned downhole of the electric machine 502 or uphole of the fluid-end 500.

In FIG. 2, the central shaft 506 is made up of multiple sub-sections coupled together: a fluid rotor 506a, a thrust bearing rotor 506b, and an electric rotor 506c. Each sub-section is joined together by a coupling 516. The coupling 516 can be a bellows, quill, diaphragm, or other coupling type that provides axial stiffness and radial compliance. In certain instances, the coupling 516 can allow for angular misalignment (e.g., misalignment of 0.30-2.0 degrees), and a lateral misalignment (e.g., misalignment of 0.01 inches). Variation in thermal growth can be designed to be accepted in the compressor and motor clearances, though the coupling 516 can tolerate some degree of axial misalignment (e.g., axial misalignment of about 0.03 inches). Larger and smaller alignment tolerances can be achieved with different coupling configurations and sizes, specific to the application needs. In some implementations, the central shaft 506 can include a single, unitary shaft that runs through the fluid-end 500, the thrust bearing module 504, and the electric machine 502.

The fluid end 500 directs fluid flow through the fluid end 500, or is driven by fluid flowing through the fluid end 500 based on a pressure differential across the fluid end 500. The electric machine 502 is configured to rotatably drive the fluid end 500 or be driven to generate electricity by the fluid-end 500. The central shaft 506 is levitated and axially supported by one or more active magnetic thrust bearing assemblies 518 located in the thrust bearing module 504. One or more passive magnetic radial bearing assemblies 522 radially levitate and support the central shaft 506. While one of each electric machine 502, thrust bearing module 504, and fluid-end 500 modules are shown, more than one of each or all are practical in this configuration, thus allowing for additional motor power, additional thrust load support, and additional flow or pressure capacity to be added independently of each other to best produce the specific well performance. In addition, while the order of electric machine 502, thrust bearing module 504, and fluid-end 500 module from downhole to uphole is shown, each module functions independently and can be placed in other orders that best suit the operation and integration of each module. Additionally, while a fluid-end 500 is shown, this can include a blower, a compressor, a liquid pump, a multiphase pump, or a combination thereof that best suits the fluids and conditions of the well to maximize well performance. In addition, the use of passive magnetic radial bearing assemblies 522 and active magnetic thrust bearing assemblies 518 can be seen as one example of such an implementation of magnetic bearings, where active radial bearings and/or passive thrust bearings can be used instead of or in addition to, in any case to enhance the downhole system performance.

In some implementations, the fluid-end 500 includes an inlet 526 to receive a fluid (e.g., gas) at the first pressure downhole of the fluid-end 500 and an outlet 528 to output the fluid at the second, higher pressure uphole of the fluid-end 500. A cylindrical outer housing 530 houses an impeller 532 in fluid communication with the inlet 526 to receive a production fluid from the wellbore 104 at the first pressure downhole of the fluid-end 500 and to drive the production fluid to the outlet 528 at the second, higher pressure uphole of the fluid-end 500. The impeller 532 is attached to or integrated with a fluid end rotor section 506a of the central rotor 506, and configured to rotate with the central rotor 506, for example, to drive or be driven by the central rotor 506. The third measurement tool 512, shown as positioned adjacent to the uphole end of the fluid end rotor section 506a, can act as a position sensor, temperature sensor, and/or pressure sensor, outputting one or more voltage signals representative of the axial position of the fluid end rotor section 506a, a temperature, and/or a pressure of an environment within the fluid end 500. In the illustrated implementation, the fluid-end 500 is coupled to an uphole end of the thrust bearing module 504 by the coupling 516 and a coupling housing 517.

As previously described, the downhole-type artificial lift system 124 moves the fluid from the downhole inlet 526 at the first pressure to the uphole outlet 528 at the second, higher pressure. This pressure differential promotes the fluid flow to move uphole of the artificial lift system 124, for example, at a higher flow rate compared to a flow rate in a wellbore without a downhole-type artificial lift system. The fluid-end 500 can operate at a variety of speeds, for example, where operating at higher speeds increases fluid flow, and operating at lower speeds reduces fluid flow. In some instances, the impeller 532 of the fluid-end 500 can operate at speeds up to 120,000 revolutions per minute (rpm). In some instances, the impeller 532 of the fluid-end 500 can be run at lower speeds (e.g., 40,000 rpm, or other).

FIG. 5 shows the electric machine 502 as coupled to a downhole end of the thrust bearing module 504. The electric machine 502 is configured to either drive the central rotor 506 or be driven by the central rotor 506 to generate electricity. In some implementations, the electric rotor section 506c includes a permanent magnet rotor that is axially levitated and supported by the thrust bearing module 504. The permanent magnet rotor 506c is coupled to the thrust bearing rotor 506b by a coupling 516. An electric stator 534 surrounds the permanent magnetic rotor 506c. The electric stator 534 includes electric coils 536. In some implementations, a passive magnetic radial bearing structure 522 can support and levitate the permanent magnet rotor 506c to the electric stator 534. As the permanent magnet rotor 506c is axially supported by the thrust bearing module 504, no thrust bearing is needed within the electric machine 502. The first measurement tool 508 positioned adjacent to the downhole end of the permanent magnet rotor 506c can act as a position sensor, temperature sensor, and/or pressure sensor, outputting one or more voltage signals representative of the axial position of the permanent magnet rotor 506c, a temperature, and/or a pressure of an environment within the electric machine 502. The stator 534 can be canned using a metallic or non-metallic sleeve on the inner diameter of the stator 534 to separate an environment within the electric machine 502 with the environment about (e.g., surrounding) the electric machine 502. In some examples, the measurement tool 508 can also be canned within the sleeve on the inner diameter of the stator 534, or the measurement tool 508 may not be canned. For example, in some instances, the canning sleeve can pass through the axial gap between the longitudinal end of the rotor 506c and the stator assembly of the measurement tool 508, where the canning sleeve does not interfere with the axial gap sensing of the axial gap generator of the measurement tool 508. In certain instances, the measurement tool 508 can be used to determine the axial position of the rotor, a pressure within the electric machine 502, a pressure of the environment (e.g., fluid) about the electric machine 502, a temperature within the electric machine 502, and/or a temperature of the environment (e.g., fluid) about the electric machine 502. The can be sealed, by welding for example, at each end and supported from any well pressure by the stator and/or potting behind the sleeve to insure it does not deform during operation. Multiple electric machines 502 can be connected in series to produce more power to drive the central rotor 506, if needed.

The electric machine 502 is controlled by a high frequency variable speed drive (e.g., VSD 140 of FIG. 1), for example, at the surface of the well. Variable frequency or speed allows the electric machine 502 to rotate the device (e.g., rotor 506) at a speed optimal for well production. It also allows for one electric machine drive to be used at many well sites where performance in speed and power vary. While sensored drives could be used, bringing sensor signals to the surface over long distances presents many challenges, including cables and connectors in addition to having the actual sensor and their associated electronics installed in the system. The downhole-type artificial lift system 124 uses a sensor-less VSD capable of long distance (>300 meters) to control the electric machine 502. This sensor-less VSD monitors the speed of the electric machine 502 and is able to maintain speed or torque control of the electric machine 502 to ensure it operates as desired. The VSD is also capable of interpreting the machine parameters and/or voltage output signals from the measurement tool 508 to provide operating data on motor temperature and fluid properties, such as density, for example.

Cables connect the topside VSD to the downhole electric machine 502, transmitting the low voltage (e.g., <600 VAC) or medium voltage (e.g., <10,000 VAC) from the VSD to the electric machine 502. For longer distances, higher voltage is desired to reduce current losses in the cable and reduce cable size. Reductions in cable size reduce cable cost and cable weight, though may require higher class of electrical insulation on the cable.

Figure 6A:
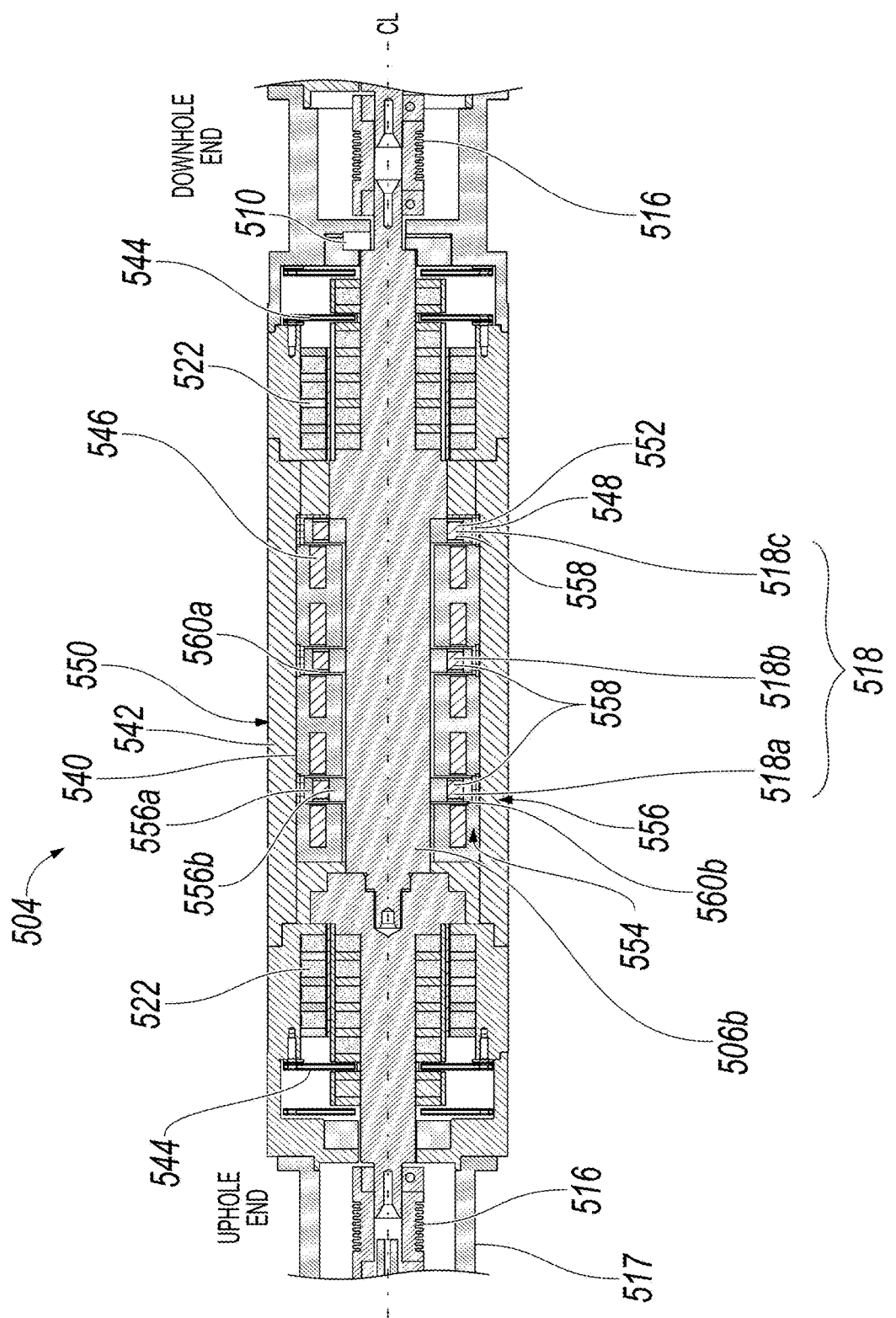
FIG. 6A is a schematic side half cross-sectional view of an example thrust bearing module.

The thrust bearing module 504 provides bearing support for the central shaft 506. FIG. 6A is a schematic side half cross-sectional view of the example thrust bearing module 504 of FIG. 5. Referring to both FIGS. 5 and 6, the thrust bearing module 504 includes one or more active magnetic thrust bearings 518 that support the central rotor 506, in particular the bearing rotor section 506b of the central rotor 506, to a surrounding stator 540. The active magnetic thrust bearing 518 is configured to levitate and support the central rotor 506 axially within an outer housing 542 (surrounding stator 540). Passive radial bearings 522 are configured to levitate and support a central rotor 506 radially within the outer housing 542.

In some implementations, an active damping circuit 544 can be included with the passive radial bearing 522. The active damping circuit 544 uses a coil to sense rotor radial motion and provide a current in size and frequency relative to this motion to a control board. The control board amplifies this signal and adjusts the relative polarity/phase to feed it back to a damping coil that reacts against the rotor field to resist the motion, thus damping out the motion. No radial position sensors or controller is required for the passive radial bearing operation. The active damping circuit 544 is able to adjust the magnetic field sufficiently enough to reduce vibration, but does not have the power to significantly affect the lifting or support characteristics of the bearing. This approach can be used for a radial axis or a longitudinal axis, where a sense coil output sensing axial motion is amplified and fed to a damping coil to react against the rotor field to resist motion. In some implementations described later, the thrust bearing module 504 can include an axial gap generator assembly separate from or incorporated into the active damping circuit 544 that generates power when the axial gap changes and thus powers a control coil to increase a levitating or centering force. Thus, it doesn't need a sensor or an outside power source/controller.

The active magnetic thrust bearing assembly 518 and the passive magnetic radial bearing assembly 522 fully support the central shaft 506 with one or more electromagnetic fields. That is, the central shaft 506 is not physically coupled to the outer housing 542 during normal operation; there is no physical connection between the central shaft 506 and the outer housing 542. In other words, the shaft 506 is spaced apart from the housing 542 and any associated mechanism connected to the housing 542, where a gap exists between the central shaft 506 and the housing 542.

In some instances, position sensors are required for the active magnetic bearing, such as for the thrust bearings 518. Position sensors can be located within the thrust bearing module 504, within the fluid end 500, or in any other location along the rotor 506, for example, a location intended to a central point of axial position control. The second measurement tool 510 can be used to provide an axial position measurement for the rotor 506, along with temperature and/or pressure measurements within the thrust bearing module 504. The measurement tool 510 can be isolated from the wellbore environment or be exposed to the wellbore environment depending on the construction of the thrust bearing module 504.

The second measurement tool 510 includes a position-sensitive axial gap generator, as described earlier, that can produce a voltage signal as the rotor 506 rotates proportional to, or as a function of, the axial gap between the axial gap generator and the rotor 506 to determine axial position of the central rotor 506. This offers a high voltage output that can be transmitted over long distances to minimize line drop and noise issues. For example, the axial gap generator of the second measurement tool 510 can tap into a communication line or another line extending topside (e.g., to the VSD 140) to provide its voltage output to a tophole device (e.g., the magnetic bearing controller 150) that interprets the voltage output into an axial position measurement.

The thrust bearing module 504 compensates for axial loads and holds, or re-centers, the axial position of the rotor 506 by applying force to the rotor 506 to maintain position or force the rotor 506 to a center, or neutral, position. For example, as loads are developed on the rotor 506 from the act of compressing or pumping fluids, the thrust bearing controller 150 senses position movement of the rotor 506 from a target set point. The controller 150 then increases the current to control coils 546 of the thrust bearing assembly 518, where the current is converted to an axial force on the rotor 506. This force can be determined based at least in part on the amount of displacement sensed and the rate of change in motion using a control approach set by the controller 150. The thrust bearing 518 with controller 150 is thus able to compensate for forces on the rotor 506 and apply corresponding off-setting axial forces to keep the rotor in an axially centered position. While a permanent magnet on the rotor configuration is shown, various configuration of thrust bearing could be applied, including all electric or alternative permanent magnet configurations.

As illustrated in FIGS. 5 and 6A, the thrust bearing module 504 allows for non-magnetic spacers 548 to be used at the rotor outer diameter for setting stator axial position and for locking the split stator assemblies 550 of the thrust bearing assembly 518. Opposite polarity permanent magnets 552 are used on the rotor 506b to allow for coil wrapping of one or more back-to-back stator "C" shaped cores 546 to reduce overall bearing size and make assembly possible in split stator halves (i.e. both use the same coil). The outer housing 542, limited by the well installation casing size and flow path requirements, limits thrust bearing outer diameter, where the rotor outer diameter is further limited by the stator spacer and adequate clearance for rotor radial motion during operation and transport, and radial rotor growth due to high speed operation. In the illustrated implementation, the stator poles 554 of the thrust bearing assembly 518 are radially offset from the rotor poles 556 on the rotor 506. With the restricted rotor outer diameter limiting the rotor pole size, the stator pole offset increases the cross section of the stator poles 554, which increases the capacity of the thrust bearing 518, increasing bearing capacity without increasing overall bearing size.

Figure 6B:
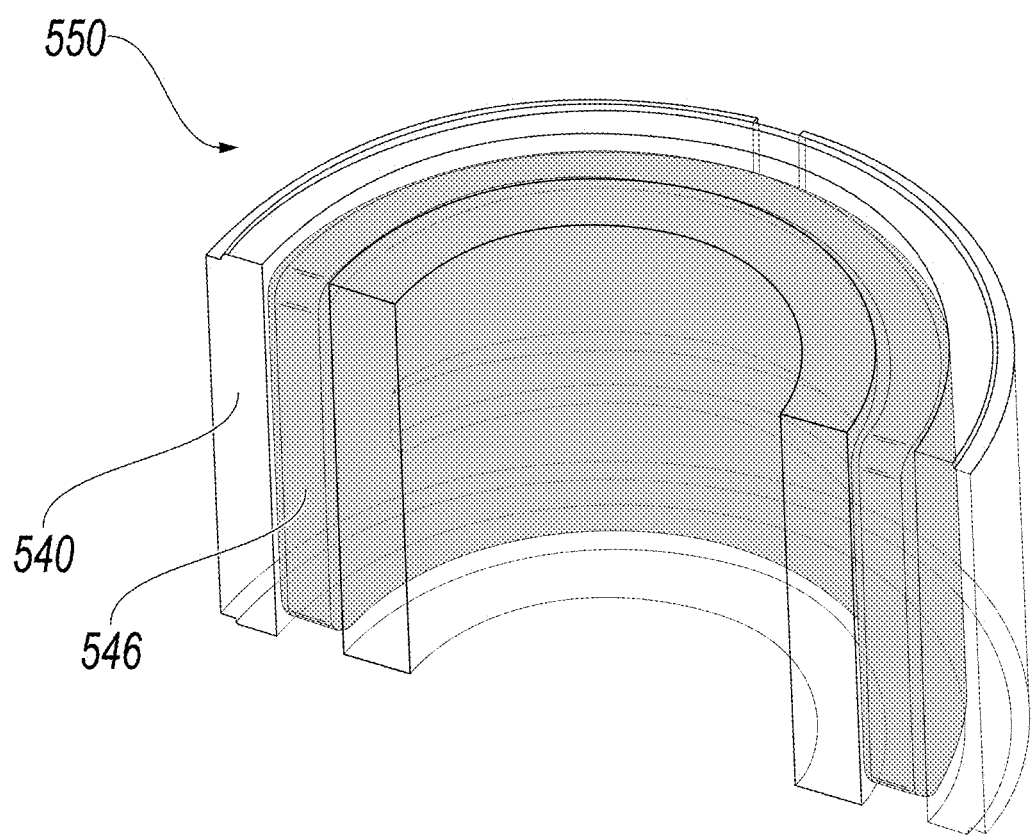
FIG. 6B is a perspective cut-away view of an example half stator pole.

Illustrated in FIG. 6B is an example "C" shaped core 546 used in the stator 550. The polarity for these coils 546 as it applies to each opposite pole face is opposite of one another. Each back to back "C" shaped core 546 is split in half to form two 180 degree assemblies. The coils 546 in each of these 180 degree assemblies are wrapped from one side to the other, and results in opposite coil polarity on each side of the "C" shaped core 546. This, in conjunction with the permanent magnets 552 on the rotor 506b having opposite polarity to the adjacent magnet, works to minimize size and simplify integration (coils that are split do not need to be routed to the outer diameter where they take up additional room and do not aid in generating bearing force).

The illustrated implementation (FIG. 6A) shows a three bearing module 518 with a first thrust bearing 518a, a second thrust bearing 518b, and a third thrust bearing 518c. The stator pole on the third thrust bearing 518c is missing in the arrangement shown, where this is to be the downhole side of the module. Since the thrust load is generally in a downhole direction as the system pushes fluid uphole, this arrangement of leaving the bottom stator pole provides a passive force in the uphole direction. That is, with no current, the module will lift the rotor 506b (and anything coupled to the rotor 506b) in an uphole direction. Further lift can be imparted on the rotor with coil current in one direction, and lift can be reduced with coil current in the opposite direction. The number of thrust bearings in a module can be one or more, depending on size, integration, rotodynamics, and other design considerations.

The bearing module 504 includes a rotor outer pole 556a. The rotor outer pole 556a is a magnetic steel pole that is magnetically acted upon by the stator pole 554 to produce force on the rotor 506b. The rotor outer pole 556a acts to conduct a permanent magnet field and a coil generated magnetic field and acts as the primary containment of the permanent magnet 558 onto the rotor for high speed operation. In some implementations the rotor outer pole 556a is secured with an interference fit on an inner diameter of the rotor outer pole 556a to the permanent magnet ring 558.

A rotor inner pole 556b is a magnetic steel pole that is magnetically acted upon by the stator pole 554 to produce force on the rotor 506b. The rotor inner pole 556b acts to conduct the permanent magnet field and the coil generated magnetic field. The rotor inner pole 556b is the primary connection point to the central shaft 506 (i.e., rotor 506b) with which the thrust bearing forces are applied to the shaft 506.

The radially magnetized permanent magnet ring 558 is a permanent magnet material that provides magnetic field that the thrust bearing 518 uses to distribute to stator poles 554 on each side of the rotor 506b, thus energizing each gap between rotor pole and stator pole. The permanent magnet field provides roughly half of the maximum field designed for the stator poles 554 and rotor poles 556a and 556b, where this level allows for linear current load response from the bearing. The permanent magnet ring 558 is radially magnetized to provide a uniform polarity field to the outer poles and inner poles. With the use of multiple thrust bearings 518, the polarity of these rotor permanent magnets 558 changes from one to the next to allow for opposite coil polarity in double stator poles.

A rotor seal can 560a is a ring that covers the permanent magnet 558 sides and is welded or otherwise sealed to the metal outer and inner poles to prevent process fluids from contacting the permanent magnet and degrading performance. The cans 560a can be metallic, and nonmagnetic, but could also be made of a non-metallic material, such as Peek or ceramic.

The thrust bearing stator pole 554 is a stator pole that includes a magnetic steel material that conducts the permanent magnet flux and electromagnet coil flux for energizing the pole air gaps that result in forces on the rotor 506b. The thrust bearing stator poles 554 are secured to the housing to transmit forces relative to the outer housing 542.

The thrust bearing coil 546 is an electromagnet coil that is a wound coil with electronic insulation to take currents from the magnetic bearing controller and convert these to magnetic field in the thrust bearing 518. In some implementations, the thrust bearing coil conductors 546 can be made of copper or a copper alloy.

The thrust bearing stator seal can 560b is a ring that covers the electromagnet coil 546 sides and is welded or otherwise sealed to the metal outer and inner poles to prevent process fluids from contacting the electromagnet coil and affecting performance. The cans 560b can be metallic, and nonmagnetic, but could also be made of a non-metallic material, such as Peek or ceramic.

The stator pole spacer 548 is a spacer that includes non-magnetic steel pieces and is used to set the relative position of two stators or a stator and housing to locate the stator poles in relation to the housing 542.

A double stator pole is split in two halves for assembly (a single half is shown in detail in FIG. 6B). These stator poles include two halves that use two coils. The coils wrap 180° on one side and then are routed to the other side where they wrap 180° back and route back to where they started to form a complete loop. This coil winding, along with polarizing the opposite rotor magnets for each subsequent rotor, allows for utilizing the complete coil loop for a split stator pole. As such the two poles are combined for minimum space necessary.

Different configurations of the thrust bearings can be used to achieve the same or similar results. In some implementations, the thrust bearings can include electromagnetic-coil based bearings, other permanent magnet based thrust bearings, and/or any other magnetic bearing assemblies configured to apply thrust forces on a rotor.

In some implementations, the thrust bearing module 504 incorporates one or more axial gap generators that provide power to the magnetic bearing system, particularly the magnetic thrust bearing actuators 518. An axial gap generator assembly separate from or incorporated into damping circuit 544 can generate power when an axial gap increases or decreases, and thus powers a control coil to increase or decrease force acting on the rotor by the magnetic bearing system, for example, in an uphole or downhole direction. The axial gap generator assembly does not need a sensor, controller, or amplifier to supply power to the active magnetic bearing system, but some implementations can use a controller and amplifier for enhanced performance and/or control. The axial gap generator(s) is reactive to longitudinal displacement of the rotor 506c. For example, an axial gap generator positioned adjacent the rotor 506c can generate an amount of power as a function of a gap spacing between the rotor 506c and the axial gap generator. The axial gap generator can provide the amount of power to one or more coils 546 of the magnetic thrust bearing actuator 518 that imparts an axial force, or thrust force, on the rotor 506c. In some implementations, an axial gap generator can generate an increased amount of power in response to movement of the rotor 506c in a first longitudinal direction (e.g., reducing a size of the gap spacing), and supply the increased amount of power to a control coil 546 of the magnetic thrust bearing actuator 518 to apply a force on the rotor 506c in a direction opposing the movement of the rotor 506c, for example, in a second direction opposite the first direction. In some examples, an axial gap generator with a stator assembly on both longitudinal ends of the rotor that are sensitive to two gap spacings can provide a balanced power output to a magnetic bearing system such that axial displacement of a rotor in a first direction or a second, opposite direction (e.g., uphole or downhole directions) causes the axial gap generator to supply an amount of power to the magnetic bearing system, and the magnetic bearing actuator can then provide a force on the rotor in a direction that opposes the axial displacement of the rotor. In some instances, an axial gap generator with a stator assembly proximate to one end of the rotor is constructed using a single rotor (e.g., a radial protrusion of the rotor such that there are two longitudinal sides of the radial protrusion) with a stator on either longitudinal side of the rotor, where the stators are sensitive to two gap spacings and can provide a balanced power output to a magnetic bearing system such that axial displacement of the rotor in a first direction or a second, opposite direction (e.g., uphole or downhole directions) causes the axial gap generator to supply an amount of power to the magnetic bearing system, and the magnetic bearing actuator can then provide a force on the rotor in a direction that opposes the axial displacement of the rotor.

Figure 7:
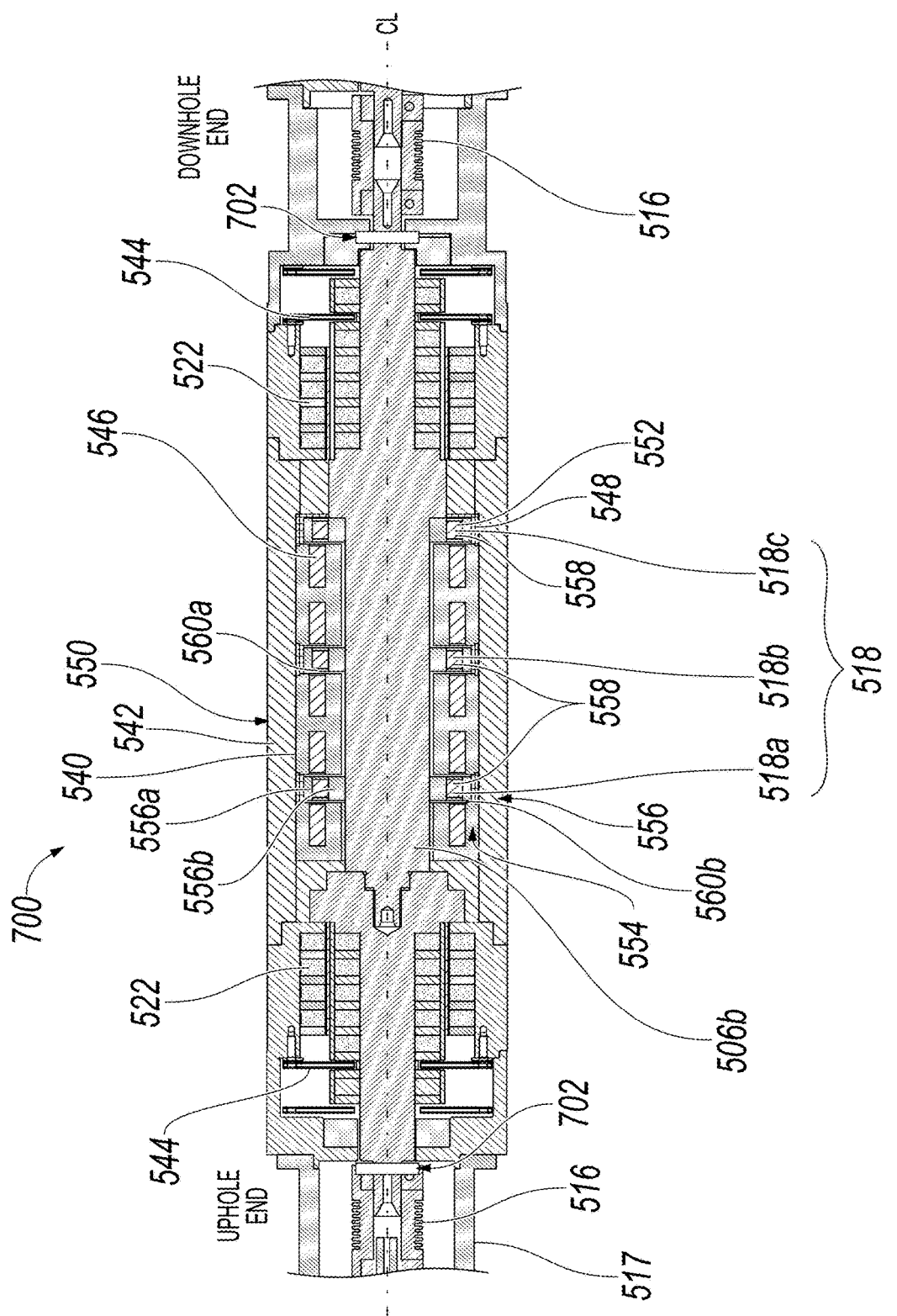
FIG. 7 is a side cross-sectional view of an example thrust bearing module that incorporates an axial gap generator assembly.

For example, FIG. 7 is a side cross-sectional view of an example thrust bearing module 700 that incorporates an axial gap generator assembly 702. The example thrust bearing module 700 is the same as the thrust bearing module 504 of FIG. 6A, except the thrust bearing module 700 includes the axial gap generator assembly 702 located adjacent to (e.g., close to, next to, or otherwise positioned to interact with) the rotor 506c. While the thrust bearing module 700 is shown as excluding the second measurement tool 510, in some examples the thrust bearing module 700 can include the second measurement tool 510 in addition to or integral with the axial gap generator assembly 702. The example thrust bearing module 700 of FIG. 7 shows the axial gap generator assembly 702 as adjacent to both longitudinal ends of the rotor 506b, but this positioning can be different. For example, the axial gap generator assembly 702 can be positioned adjacent to only one longitudinal end of the rotor 506b, or adjacent to one or more longitudinal sides of a radial protrusion of the rotor 506b, described in more detail later. The axial gap generator assembly 702 generates an amount of power based on a longitudinal location of the rotor 506c relative to the axial generator assembly 702, and supplies that amount of power to the magnetic thrust bearing actuator 518. The axial gap generator assembly 702 electrically connects to the thrust bearing actuator 518 such that movement of the rotor 506c in a first longitudinal direction (e.g., in an uphole direction or a downhole direction) causes the axial generator assembly 702 to generate an amount of power that is supplied to a control coil 546 of the thrust bearing actuator 518, where the coil 546 imparts a force on the rotor 506c in a direction that opposes the movement of the rotor 506c, for example, in a second longitudinal direction opposite the first longitudinal direction. The axial gap generator assembly 702 acts as a passive, or reactive, generator that supplies an entirety of the power it generates to the thrust bearing actuator 518, and does not require a controller or other processing device to control and transmit the amount of power to the bearing actuator 518 as a function of the axial position of the rotor 506c (e.g., the gap spacing between the axial gap generator and the rotor 506c). For example, all of the power generated by the axial gap generator assembly 702 is sent directly to the control coil(s) 546 of the thrust bearing assembly 518. In the example shown in FIG. 7, a rectifier between the axial gap generator assembly 702 and the control coils 546 converts an AC signal from the generator assembly 702 to DC signal to the control coils 546, while maintaining all of the power output from the generator assembly 702 to the control coils 546 other than inherent minor losses in converting from AC to DC. While a rectifier, amplifier, or other intermediate device may be connected between the axial gap generator assembly 702 and the thrust bearing assembly 518, there is no decrease in the amount of power from the axial generator assembly 702 to the thrust bearing actuator 518, other than inherent minor losses.

Figure 8A:
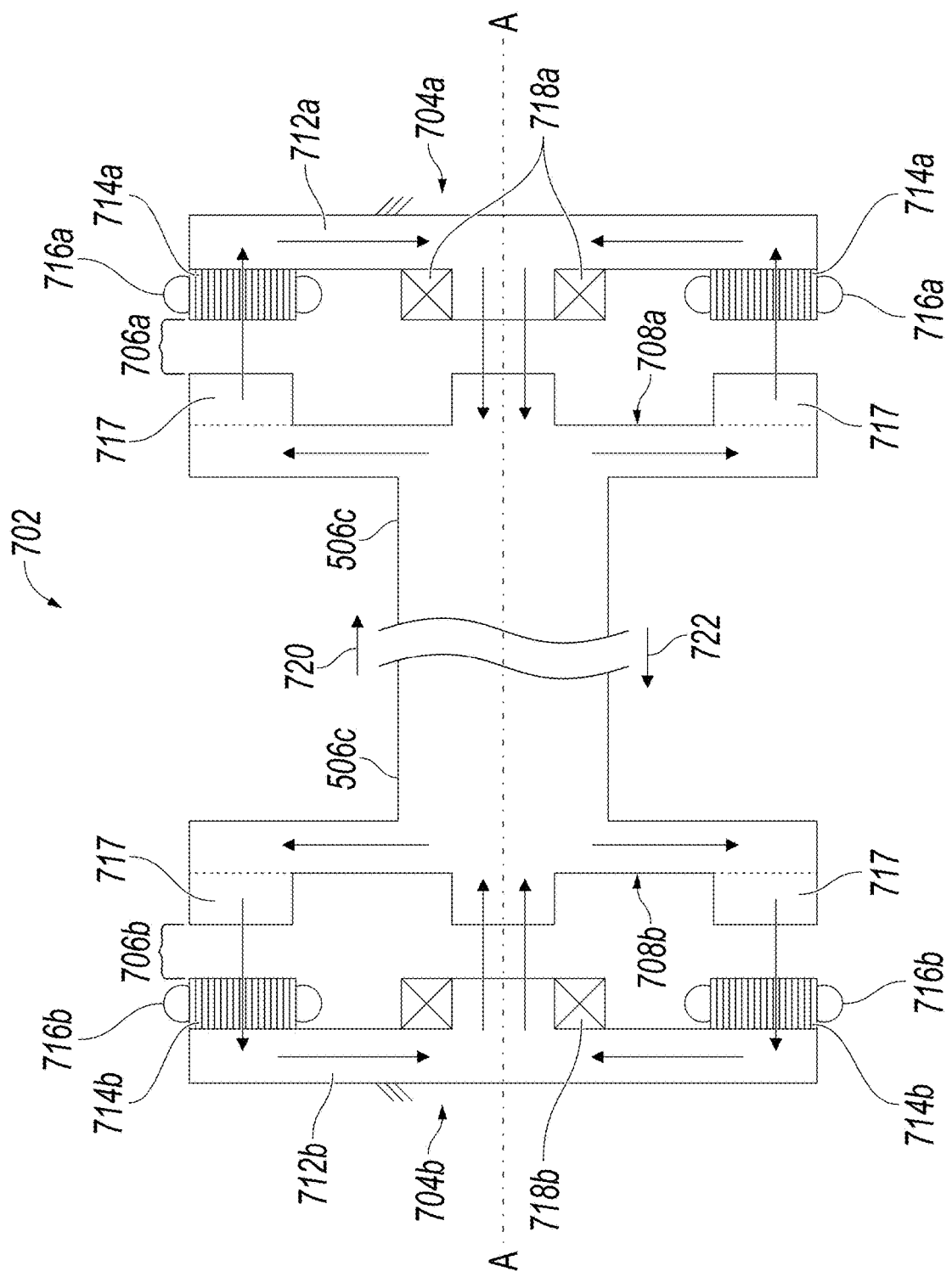
FIGS. 8A-8D are partial schematic cross-sectional side views of an example axial gap generator assembly positioned adjacent to a rotor.

FIG. 8A is a partial schematic cross-sectional side view of the example axial gap generator assembly 702 of FIG. 7 positioned adjacent to the rotor 506c. The axial gap generator assembly 702 outputs an amount of power based on an axial position of the rotor 506c, for example, along the longitudinal axis A-A about which the rotor 506c is configured to rotate. The axial gap generator assembly 702 is a displacement based response system, where an axial offset of the rotor 506c from a neutral, center position causes an output imbalance from the axial generator assembly 702, which is fed to the thrust bearing actuator assembly 518 that imparts a force on the rotor 506c based on the imbalance. The axial gap generator assembly 702 is self-controlling in that it does not require a controller or other external control circuit to operate, and operates as a passive device responsive to axial displacement of the rotor 506c. While the axial generator assembly 702 is shown and described as incorporated into the thrust bearing module 504 of FIG. 7, the axial generator assembly 702 can be incorporated into a different rotating assembly with a different magnetic bearing assembly. In other words, the axial generator assembly 702 can engage with a rotating rotor of another rotating tool, and can provide a power output to a control coil of a different magnetic bearing assembly.

The axial gap generator assembly 702 includes a first stator assembly 704a that is sensitive to a first axial gap 706a between a first longitudinal end 708a of the rotor 506c and the first stator assembly 704a, and parallel to the longitudinal axis A-A, and includes a second stator assembly 704b that is sensitive to a second axial gap 706b between a second longitudinal end 708b of the rotor 506c and the second stator assembly 704b. Each of the first stator assembly 704a and the second stator assembly 704b can be similar to the stator assembly 208 of the axial gap generator 206 of FIGS. 2A-3. For example, the stator assemblies 704a and 704b each have a stator back structure 712a and 712b, stator poles 714a and 714b, and stator coils 716a and 716b surrounding respective stator poles 714a and 714b, respectively. The axial gap generator assembly 702 generates the amount of power as a function of the first gap spacing 706a between the first stator assembly 704a and the rotor 506c and the second gap spacing 706b between the second stator assembly 704b and the rotor 506c. The rotor 506c is shown as having rotor poles 717 adjacent to the stator poles 714a and 714b. Each stator assembly 704a and 704b include a magnetic field source in the form of a field coil 718a and 718b, respectively, where the axial gap generator assembly 702 is an electromagnetic-type generator. The field coils 718a and 718b can be connected to a local power source or other power source to provide a current to the respective stator assemblies 704a and 704b. In some embodiments, the axial gap generator assembly 702 is a permanent magnet-type generator, where the field source includes a permanent magnet, for example, instead of the electromagnetic field coils 718a and/or 718b.

The gap spacings 706a and 706b are parallel to the longitudinal axis A-A. The size of the axial gap spacings 706a and 706b determines the power output of the axial gap generator assembly 702. The axial gap generator assembly 706 varies the power output reflective of a variance in the gap spacings 706a and 706b, for example, in response to a displacement of the rotor 506c relative to the stator assemblies 704a and 704b and parallel to the longitudinal axis A-A. For example, when the rotor 506c moves with respect to the longitudinal axis A-A, the gap spacings 706a and 706b change, and a flux across each of the gap spacings 706a and 706b reaching the respective stator assemblies 704a and 704b changes; thus the first stator assembly 706a and the second stator assembly 706b produce a different power output signal as the gap spacings 706a and 706b vary. In some examples, the stator assemblies 704a and 704b are mounted to a housing of the thrust bearing module 504 or other fixed structure, while the rotor 506c is designed to longitudinally displace to some degree (for example, up to a size of the gap spacing 706a or gap spacing 706b) during operation.

The axial gap generator assembly 702 generates an amount of power (e.g., in the form of a voltage output) as a function of one or both of the gap spacings 706a and 706b. In the example assembly 702 of FIG. 8A, the axial gap generator assembly 702 outputs a single power output signal reflective of the axial position of the rotor and as a function of both the first gap spacing 706a and the second gap spacing 706b. The first stator assembly 704a produces a first power output as a function of the first gap spacing 706a, and the second stator assembly 704b produces a second power output as a function of the second gap spacing 706b, and the first and second power outputs are combined into a single power output signal sent to the thrust bearing assembly 518, and the first and second power outputs are out of phase such that a single power output signal can have a directional response (e.g., uphole or downhole force) when actuated at the thrust bearing actuator 518. In some examples, the single power output from the axial generator assembly 702 is zero when the rotor is centered, where the first stator assembly 704a output and the second stator assembly 704b output cancel each other out when combined. As the rotor 506c axially moves in a first direction 720 or a second direction 722 opposite the first direction 720 and parallel to the longitudinal axis A-A, the polarity of the single output from the axial generator assembly 702 changes, thereby changing the net axial force on the rotor for an independently biased magnetic bearing actuator.

For example, referencing both the thrust bearing module 700 of FIG. 7 and the axial gap generator assembly 702 of FIG. 8A, the actuator configuration is a permanent magnet that provides a bias field to the actuator. The output of both stator assemblies 704a and 704b of the axial gap generator assembly 702 can be combined, with the first stator assembly 704a (e.g., first generator) being 180 degrees out of phase with the second stator assembly 704b (e.g., second generator). When the axial gap spacings 706a and 706b at both generators is equal or the same, no net power is provided to the thrust actuator assembly 518. For example, no force on the rotor 506c is desired to be applied to the rotor 506c since the rotor is centered. As the axial position of the rotor 506c changes one way or the other (e.g., in the first direction 720 or the second direction 722), the power output balance (e.g., net-zero power) out of the generator assembly 702 changes, and power is either positive or negative depending on the displacement direction of the rotor 506c and direction of force desired to pull the rotor 506c in a direction opposite from the displacement. In some instances, this net power output of the generator assembly 702 can be accomplished with the rotor poles or stator windings being out of phase with each other, such that when the power output signals from the stator assemblies 704a and 704b are combined with each other, a net power output is realized. In certain instances, the net power output of the generator assembly 702 can be done in a rectifier circuit at a rectifier, where one stator assembly output is on the positive leg and the other stator assembly output is on the negative leg. When the power outputs from the stator assemblies are equal (e.g., at the center position of the rotor 506c), the net power output to the thrust bearing actuator assembly 518 is zero. Other methods of power generation from the stator assemblies are possible though, as described elsewhere in this disclosure.

Figure 8B:
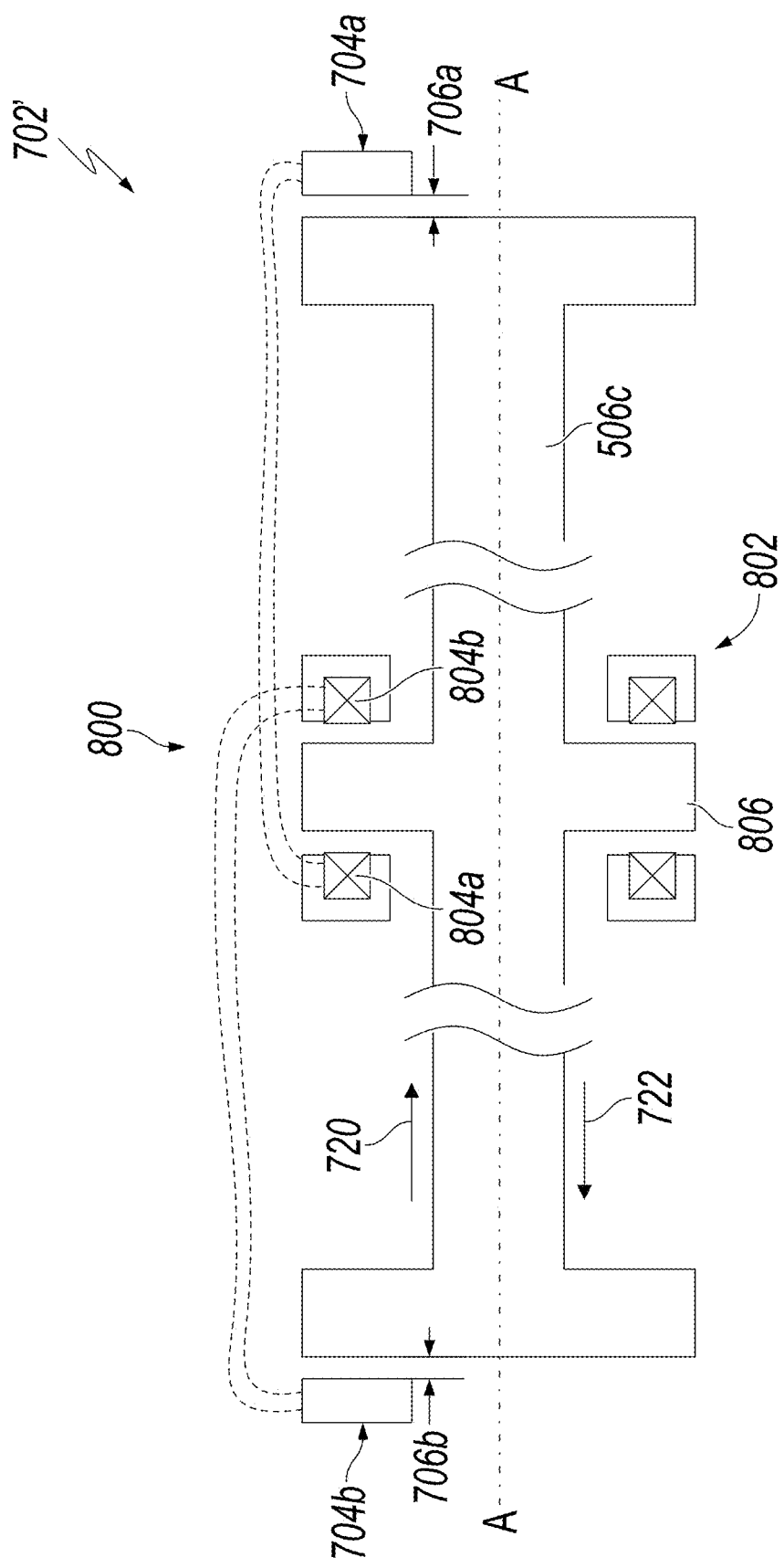

The axial gap generator assembly 702 generates an amount of power (e.g., in the form of a voltage output) as a function of one or both of the gap spacings 706a and 706b. In the example assembly 702 of FIG. 8A, the first stator assembly 704a and the second stator assembly 704b electrically connect to a thrust bearing actuator, such as the thrust bearing actuator assembly 518 of FIG. 7, to provide a combined output for the biased thrust bearing actuator to act on the rotor 506c. In some implementations, the thrust bearing type can be different, such as thrust bearings configured without a bias field, and an axial gap generator assembly can provide a power output to these other configurations of a thrust bearing. For example, each stator assembly of an axial gap generator assembly can provide its own power output to a respective bearing coil, as opposed to a combined power output signal from multiple stator assemblies. FIG. 8B is a partial schematic cross-sectional side view of an example axial gap generator assembly 702' positioned adjacent to the rotor 506c. The axial gap generator assembly 702' is the same as the axial gap generator 702 of FIG. 8A, except the assembly 702' connects to a different thrust bearing assembly type, particularly thrust bearing assembly 800, which axially supports the rotor 506c. The axial gap generator 702' is structurally similar to the axial gap generator 702 of FIG. 8A, and is configured to output an amount of power based on the axial position of the rotor 506c. In the example assembly 702' of FIG. 8B, the first stator assembly 704a electrically connects to a first control coil 804a of a thrust bearing actuator 802 of the thrust bearing assembly 800, and the second stator assembly 704b electrically connects to a second control coil 804b of the thrust bearing actuator 802. The first stator assembly 704a is positioned on a downhole side of the rotor 506c while the first coil 804a of the thrust bearing actuator 802 is positioned on an uphole side of a rotor pole 806. The second stator assembly 704b is positioned on an uphole side of the rotor 506c while the second coil 804b of the thrust bearing actuator 802 is positioned on a downhole side of the rotor pole 806. As the rotor 506c rotates, the first stator assembly 704a supplies a first amount of power to the first coil 804a, and the second stator assembly 704b supplies a second amount of power to the second coil 804b, where the first coil 804a acts to provide a force on the rotor in a first axial direction and the second coil 804b acts to provide a force on the rotor in a second axial direction opposite the first direction. The first coil 804a and the second coil 804 impart a pulling force against the rotor 506c, in that a force by the first coil 804a is a force on the rotor 506c toward the first coil 804a, and a force by the second coil 804b is a force on the rotor 506c toward the second coil 804b. For example, in a center position of the rotor where the first axial gap 706a and the second axial gap 706b are the same size, the amount of power provided to the coils of the magnetic bearing actuator 802 results in a net zero force on the rotor 506c from the magnetic bearing actuator 802. In other words, at the center position of the rotor, a non-zero force applied on the rotor 506c from the first coil 804a and a non-zero force applied on the rotor 506c from the second coil 804b is equal in magnitude and opposite in direction, so a net force on the rotor 506c is zero. As the rotor 506c moves axially, the gap spacings 706a and 706b change, and the first and second amounts of power from the stator assemblies 704a and 704b change, resulting in a non-zero net force on the rotor 506c. For example, as the rotor 506c moves in the first direction 720, the first gap spacing 706a gets smaller and the second gap spacing 706b gets larger. The first stator assembly 704a provides an increase amount of power to the first coil 804a based on the smaller first gap spacing 706a as compared to the second stator assembly 704b, which provides a decreased amount of power to the second coil 804b based on the larger second gap spacing 706b. The force applied on the rotor 506c from the first coil 804a is larger than the force applied on the rotor 506c from the second coil 804b, resulting in a net force on the rotor in the second direction 722 opposite the first direction 720, where the net force opposes the axial displacement of the rotor 506c. In some examples, as the rotor 506c moves in the second direction 722, the first gap spacing 706a gets larger and the second gap spacing 706b gets smaller. The first stator assembly 704a provides a decreased amount of power to the first coil 804a based on the larger first gap spacing 706a as compared to the second stator assembly 704b, which provides an increased amount of power to the second coil 804b based on the smaller second gap spacing 706b. The force applied on the rotor 506c from the second coil 804b is larger than the force applied on the rotor 506c from the first coil 804a, resulting in a net force on the rotor in the first direction 720 opposite the second direction 722, where the net force opposes the axial displacement of the rotor 506c.

While one version of the magnetic thrust bearing 802 is shown in FIG. 8B, various other configurations of the thrust bearing can be used that can function in the same manner with an axial gap generator providing power that is dependent on rotor position and axial gap generator gap spacing.

Figure 8C:
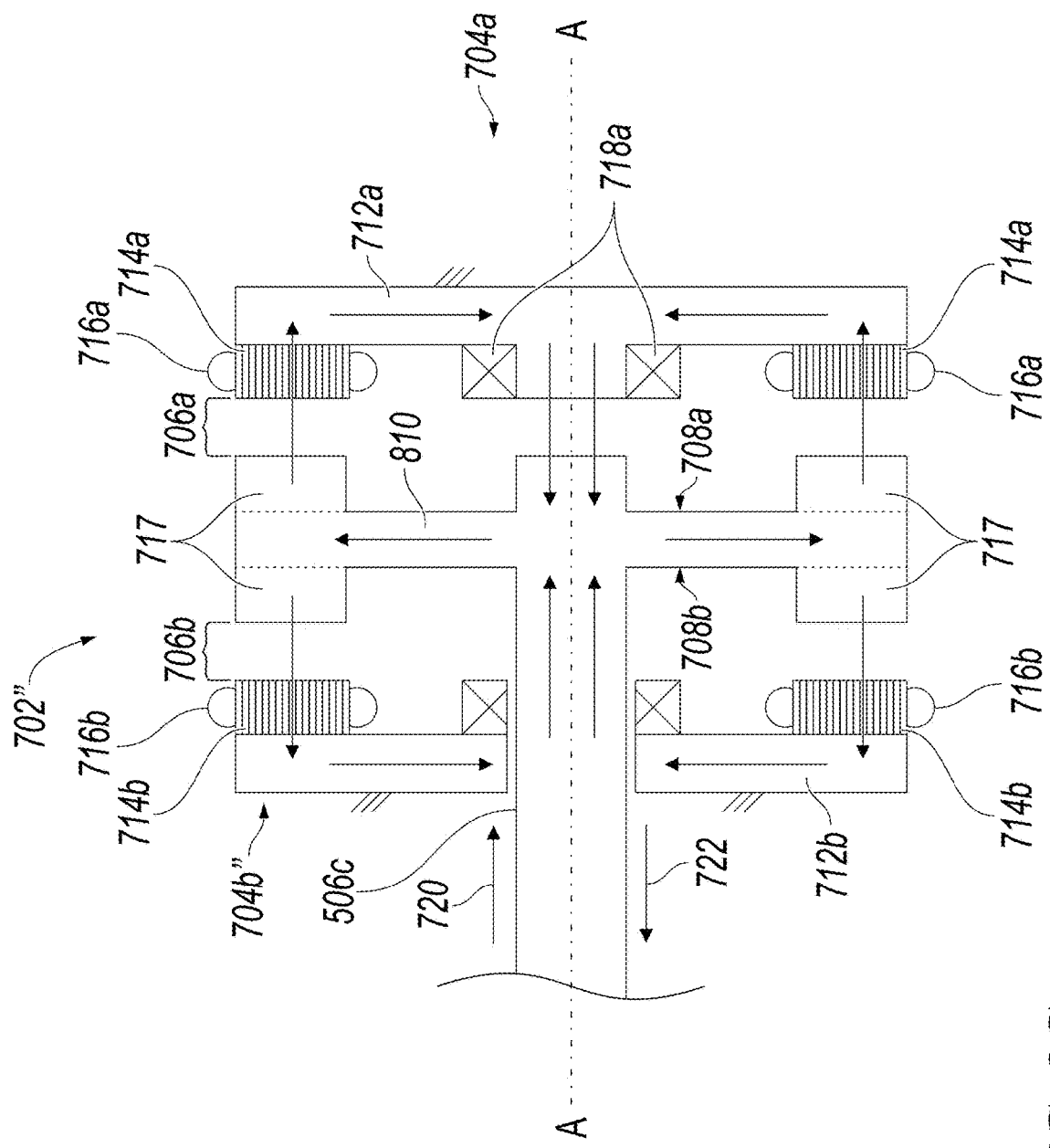

While FIGS. 8A and 8B show the axial gap generator assemblies and respective stator assemblies positioned at longitudinal ends of the rotor 506c, the position of the axial gap generator assemblies and their respective stator assemblies can vary. The stator assemblies can be positioned anywhere along the longitudinal length of the rotor adjacent to a rotor element or rotor pole extending radially from the central axis A-A. For example, FIG. 8C is a partial schematic cross-sectional side view of an example axial gap generator assembly 702" positioned adjacent to the rotor 506c. The axial gap generator assembly 702" is the same as the axial gap generator 702 of FIG. 8A, except the second stator assembly 704b" is positioned on an opposite longitudinal side of the rotor element 810 opposite from the first stator assembly 704a, instead of on an opposite longitudinal end of the rotor 506c. The rotor element 810 includes rotor poles 717 extending in both longitudinal directions and positioned adjacent to (but spaced apart from) respective stator coils. The second stator assembly 704b" of FIG. 8C is positioned on an uphole side 708b of the rotor element 810 at the downhole end of the rotor 506c, where the downhole end of the rotor 506c includes the radially extending rotor element 810. However, the orientation of the axial gap generator assembly 702" can be positioned elsewhere, for example, at an uphole end of the rotor 506c, or at an intermediate location of the rotor 506c between the uphole end and the downhole end, such as adjacent to a rotor element extending radially outward at an intermediate location of the rotor 506c. The second stator assembly 704b" is similar to the second stator assembly 704b of FIG. 8A, except the second stator assembly 704b" includes a central aperture through which the rotor 506c extends through. The axial gap generator assembly 702" can function like the axial gap generator assemblies 702, and/or 702' of FIGS. 8A-8B in generating an amount of power, for example, for a magnetic bearing assembly.

Figure 8D:
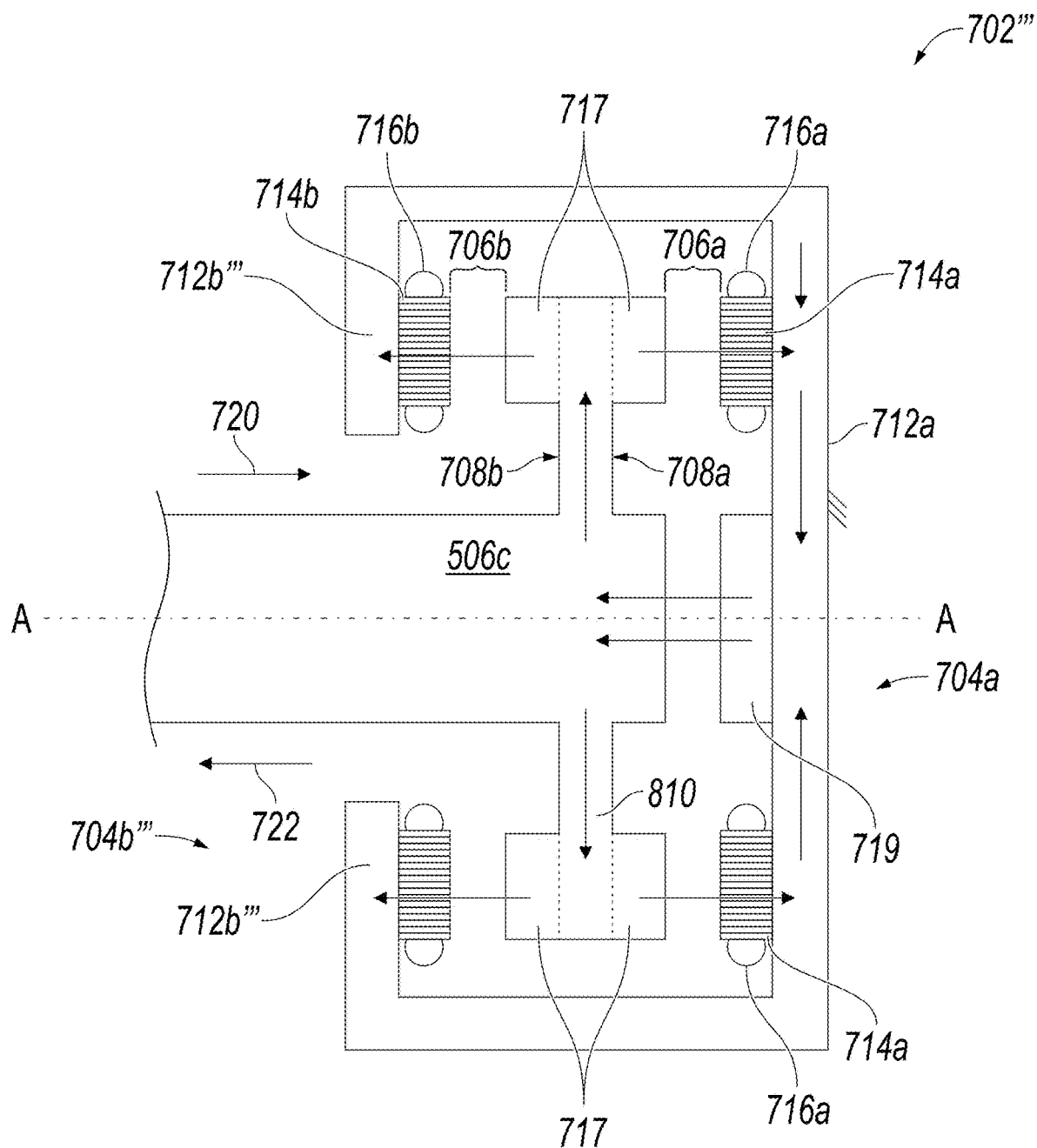

In some implementations, the first stator assembly and second stator assembly can be partially incorporated with each other, for example, in that a stator back structure extends to either side of a rotor element positioned at a longitudinal end of the rotor or at an intermediate location along a length of the rotor, and/or can use a permanent magnet for a magnetic field source. For example, FIG. 8D is a partial schematic cross-sectional side view of an example axial gap generator assembly 702'" positioned adjacent to the rotor 506c. The axial gap generator assembly 702'" is similar to the axial gap generator 702" of FIG. 8C, except the second stator back structure 712b'" of the second stator assembly 704'" is formed as part of the first stator back structure 712a, and extends around the rotor element to position the second stator coils 716b on the opposite side of the radially extending rotor element, and the assembly 702'" uses a permanent magnet 719 as opposed to electromagnetic coils 718a. The stator back structures together form a U-shape to substantially surround the rotor element 810 and position the stator coils adjacent to the rotor poles 717 of the rotor element 810. The axial gap generator assembly 702'" can function like the axial gap generator assemblies 702, 702' and/or 702" of FIGS. 8A-8C in generating an amount of power, for example, for a magnetic bearing assembly.

While FIGS. 8A-8D show various orientations of an axial gap generator assembly and respective positions of the stator assemblies, other orientations and positions of the stator assemblies are possible.

In either of the example axial gap generator assembly arrangements of FIGS. 8A to 8D, resultant forces applied to the rotor 506c based on the power output(s) from the generator assemblies may not restore the rotor back to centered position, but instead the rotor 506c reaches an equilibrium position where the thrust bearing force as a result of rotor displacement is equal to the force applied on the rotor. This applied force can be due to a variety of factors during operation, for example, from a compressor, pump, turbine, gravity, weight, or other imparted axial loads.

Referring to any of FIGS. 7-8D, as the rotor 506c moves axially, the voltage of one stator assembly decreases while the voltage of the other stator assembly increases, changing the output current of the axial gap generator assembly (702, 702',702", or 702'") to the respective coil or coils of the respective thrust bearing assembly. This change in the output current can occur at a rate that is linearly responsive or non-linearly responsive to the axial position of the rotor 506c, where the change is greater than a negative stiffness of the thrust bearing assembly. For example, for an axial displacement of the rotor 506c of 0.001 inches, an axial force on the rotor 506c may be 10 lbs, but at an axial displacement of 0.002 inches, an axial force on the rotor 506c may be 20 lbs, 30 lbs, or a different non-linear response. As the rotor 506c axial displaces or deflects, a bearing force is increased to compensate for the deflection to arrive at a new equilibrium position of the rotor 506c.

In some implementations, the axial gap generator assembly (702, 702',702", or 702'") can utilize passive or active axial rotor damping. For example, axial rotor damping can be applied in the form of an eddy current damper. The eddy current damper can use copper and a magnetic field, or an axial damper can be an amplified version that uses a coil to sense magnetic field change and amplify this to be fed to the damping coils.

In some implementations of the axial gap generator assembly (702, 702',702", or 702'"), the second stator assembly is excluded, and the first stator assembly 704a generates the entirety of the amount of power supplied to a control coil of the thrust bearing assembly (e.g., the control coil 546 of the thrust bearing assembly 518, or first coil 804a of thrust bearing assembly 802). For example, while FIGS. 8A through 8D show two stator assemblies, an axial gap assembly may include only one stator assembly that provides an amount of power to a magnetic bearing, for example, to provide a constant bias axial force against a rotor using the amount of power from the one stator assembly.

While FIGS. 7, 8A, and 8B shows the first stator assembly 704a and second stator assembly 704b as positioned at longitudinal ends of the rotor 506c, the stator assemblies can be positioned adjacent to a longitudinal side surface of the rotor, for example, such as a longitudinal side surface of a disc-like protrusion or rotor pole extending radially from the rotor 506c, for example, as shown in FIGS. 8C and/or 8D. During operation of a tool (e.g., thrust bearing module 504) that rotates the rotor 506c, the axial gap generator assembly 702, 702',702", and/or 702'" generates an amount of power as the rotor 506c rotates about the longitudinal axis A-A, where the amount of power generated by each stator assembly is affected by an axial position of the rotor 506c and/or a displacement of the rotor 506c along the longitudinal axis A-A, for example, in response to fluctuations in an environment surrounding the thrust bearing module 504, fluctuations in an operation of the thrust bearing module 504, and/or other factors.

In some implementations, a rectifier (not shown) is connected between the axial gap generator assembly and the thrust bearing actuator, for example, to convert the amount of power from an alternating current output (e.g., from the axial gap generator assembly) to a direct current output (e.g., received by the thrust bearing actuator). For example, a first rectifier (not shown) connected between the first stator assembly 704a and the first coil of the thrust bearing actuator can convert the first amount of power from the first stator assembly 704a from an alternating current output to a direct current output. Similarly, a second rectifier (not shown) connected between the second stator assembly 704b and the second coil of the thrust bearing actuator can convert the second amount of power from the second stator assembly 704b from an alternating current output to a direct current output.

In some implementations, an amplifier (not shown) is connected between the axial gap generator assembly and the thrust bearing actuator, for example, to amplify the output from the axial gap generator assembly to the thrust bearing actuator. For example, a first amplifier (not shown) connected between the first stator assembly 704a and the first coil of the thrust bearing actuator can amplify the first amount of power from the first stator assembly 704a to the first coil. Similarly, a second amplifier (not shown) connected between the second stator assembly 704b and the second coil of the thrust bearing actuator can amplify the second amount of power from the second stator assembly 704b to the second coil.

The axial gap generator assembly 702 is illustrated in FIGS. 7 and 8A as incorporated into the thrust bearing module 504. However, the axial gap generator assembly 702, and/or the axial gap generator assembly 702', can be incorporated into other devices and tools with a rotating rotor. For example, the axial gap generator 702, 702',702", or 702''' can be incorporated into a motor, generator, compressor, blower, pump, turbine, a combination of these, or another device. While FIGS. 7, 8A, 8B, 8C, and 8D show one or two generator assemblies with one or two magnetic bearing assemblies, a different number of generator assemblies and/or magnetic bearings can be utilized. For example, multiple generator assemblies with multiple magnetic bearings assemblies (e.g., thrust bearings) can be incorporated on a single shaft (e.g., rotor) or on multiple shafts. For example, a downhole-type tool with a single shaft can incorporate one, two, three, or more axial gap generator assemblies and one, two, three, or more thrust bearings on a single shaft of the downhole-type tool.

Figure 9A:
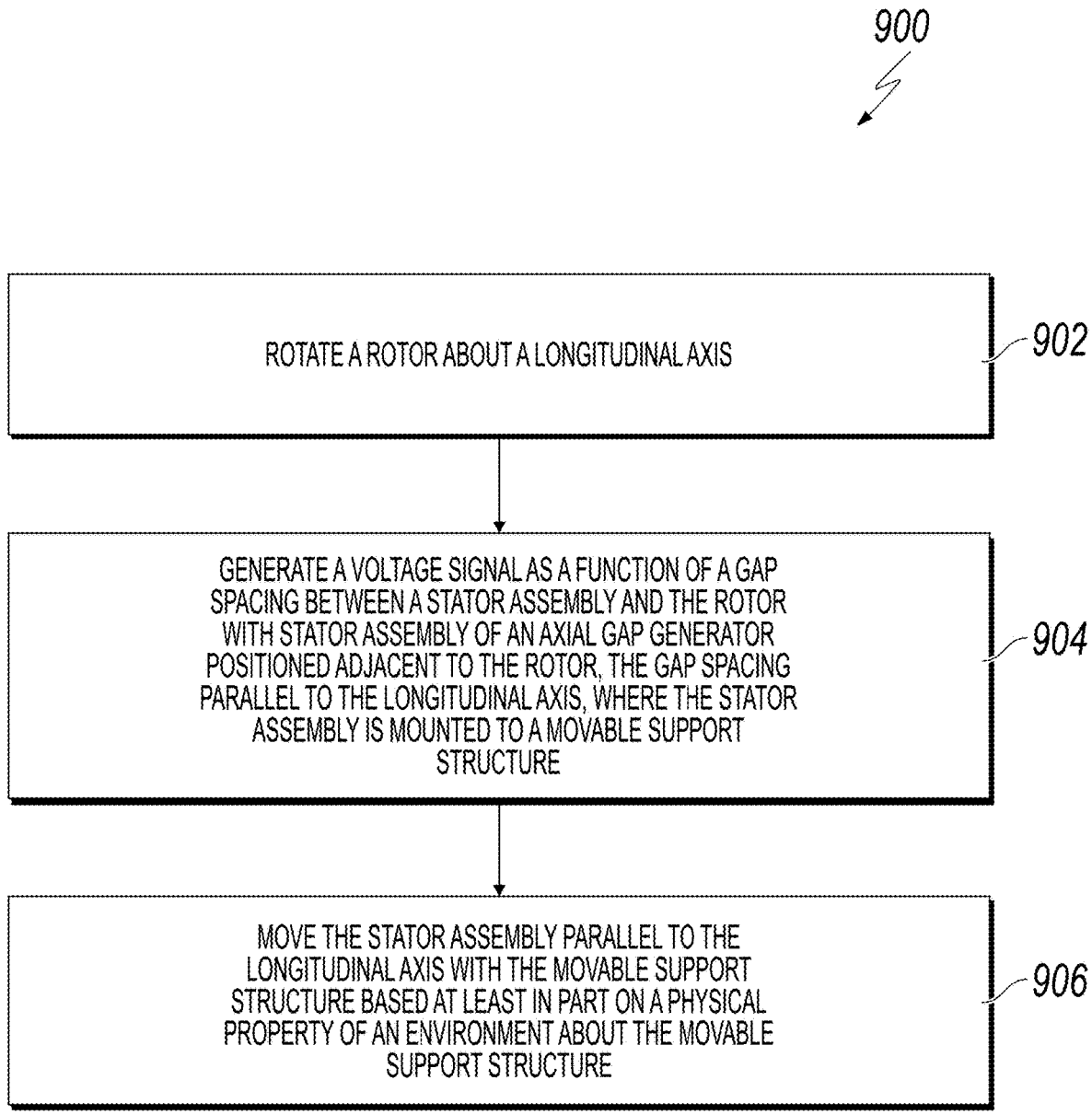
FIGS. 9A, 9B, 10, and 11 are flowcharts describing example methods for using an axial gap generator.

The components described previously within this disclosure can be used to implement the example method 900 shown in FIG. 9A. For example, method 900 can be performed by the example measurement tool 200, 300, 400, 410, 420, 508, 510, and/or 512. At 902, a rotor is rotated about a longitudinal axis. At 904, a stator assembly of an axial gap generator positioned adjacent to the rotor generates a voltage signal as a function of a gap spacing between the stator assembly and the rotor, where the gap spacing is parallel to the longitudinal axis, and the stator assembly is mounted to a movable support structure. At 906, the movable support structure moves the stator assembly parallel to the longitudinal axis based at least in part on a physical property of an environment about the movable support structure.

Figure 9B:
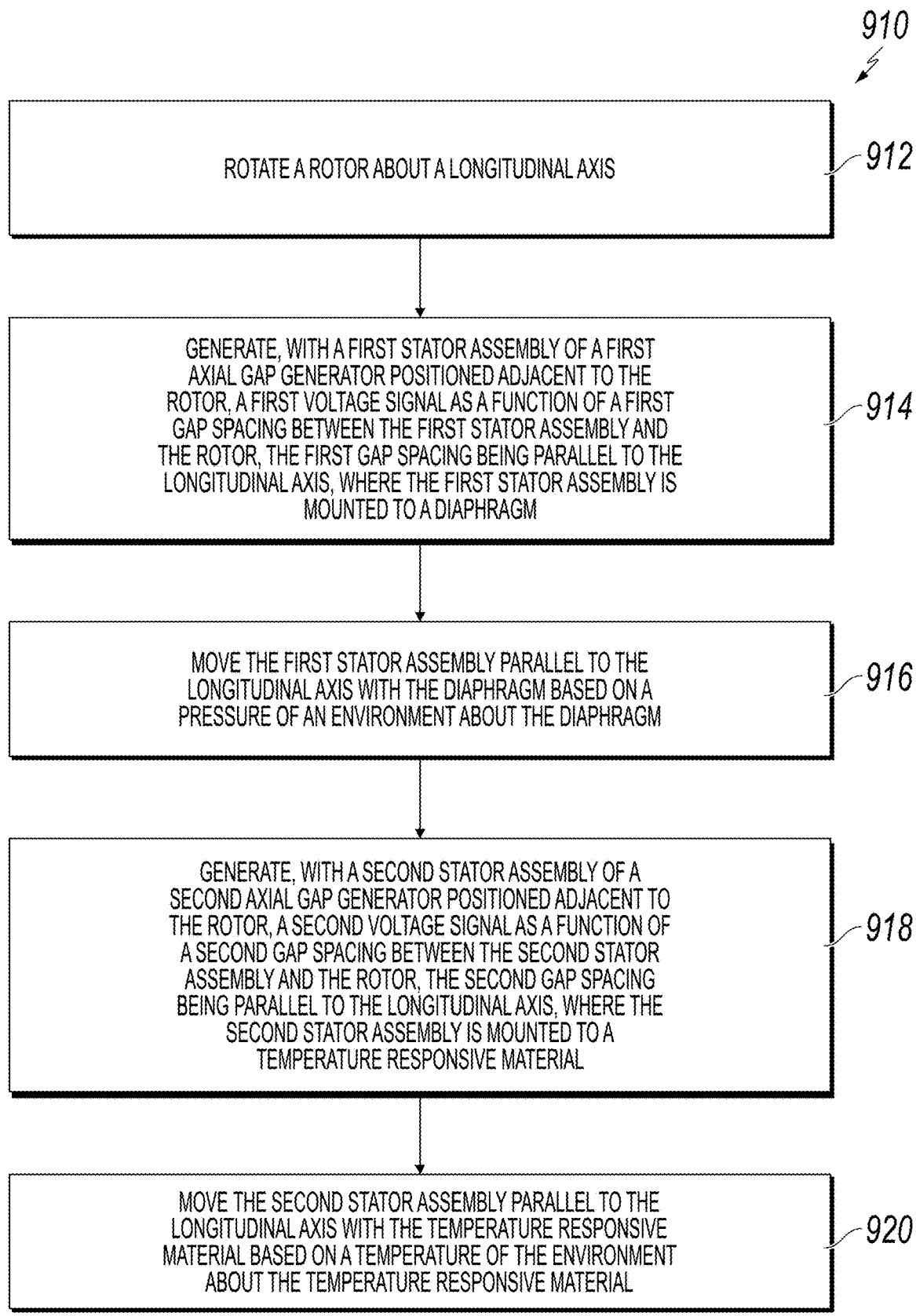

The components described previously within this disclosure can be used to implement the example method 910 shown in FIG. 9B. For example, method 910 can be performed by the example measurement tool 200, 300, 400, 410, 420, 508, 510, and/or 512. At 912, a rotor is rotated about a longitudinal axis. At 914, a first stator assembly of a first axial gap generator positioned adjacent to the rotor generates a first voltage signal as a function of a first gap spacing between the first stator assembly and the rotor, the first gap spacing being parallel to the longitudinal axis, where the first stator assembly is mounted to a diaphragm. At 916, the diaphragm moves the first stator assembly parallel to the longitudinal axis based on a pressure of an environment about the diaphragm. At 918, a second stator assembly of a second axial gap generator positioned adjacent to the rotor generates a second voltage signal as a function of a second gap spacing between the second stator assembly and the rotor, the second gap spacing being parallel to the longitudinal axis, where the second stator assembly is mounted to a temperature responsive material. At 920, the temperature responsive material moves the second stator assembly parallel to the longitudinal axis based on a temperature of the environment about the temperature responsive material.

Figure 10:
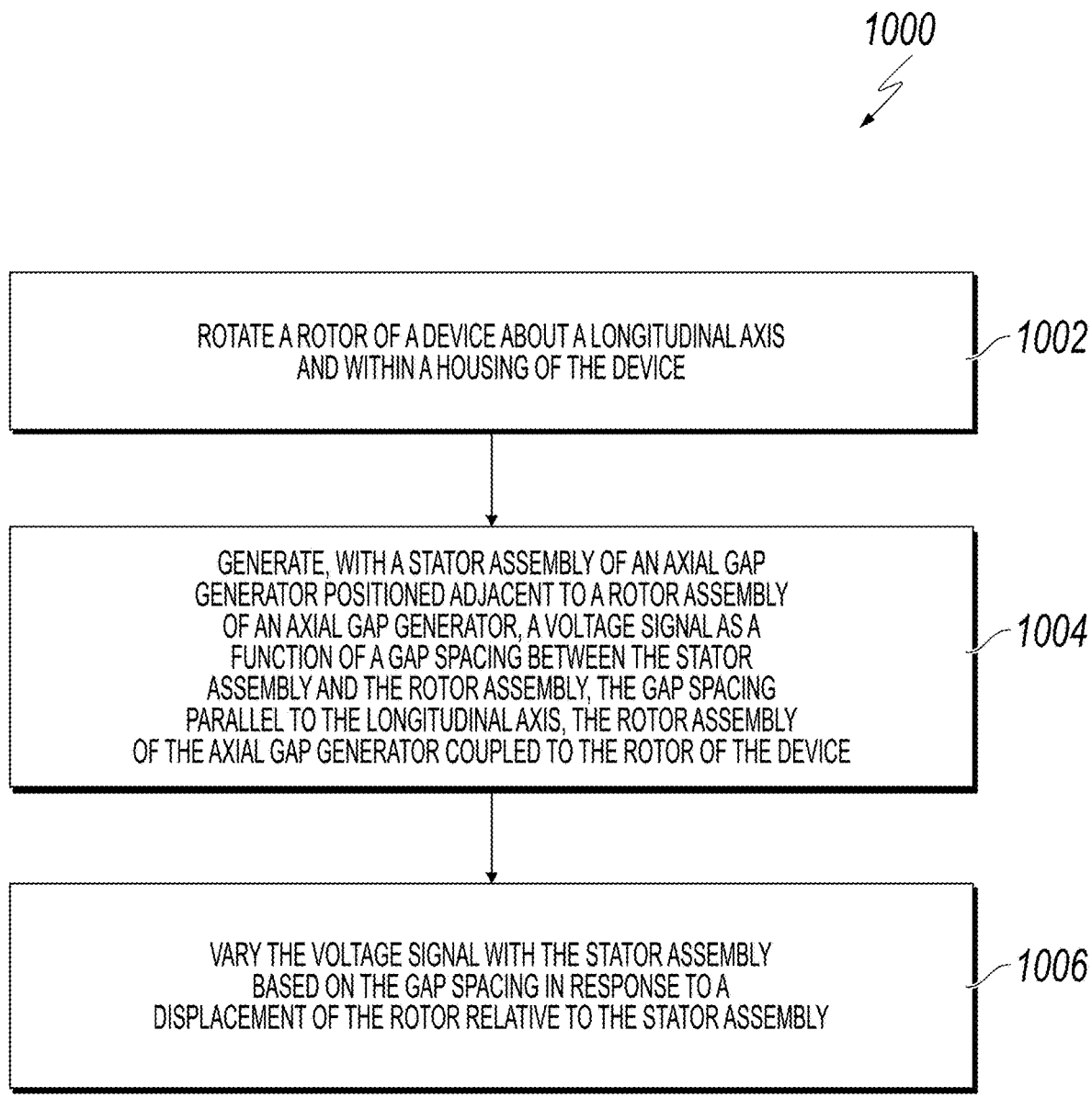

The components described previously within this disclosure can be used to implement the example method 1000 shown in FIG. 10. For example, method 1000 can be performed by the example measurement tool 200, 300, 400, 410, 420, 508, 510, and/or 512. At 1002, a rotor of a device is rotated about a longitudinal axis and within a housing of the device. At 1004, a stator assembly of an axial gap generator positioned adjacent to the rotor assembly of an axial gap generator generates a voltage signal as a function of a gap spacing between the stator assembly and the rotor assembly, the gap spacing being parallel to the longitudinal axis. At 1006, the stator assembly varies the voltage signal based on the gap spacing in response to a displacement of the rotor relative to the stator assembly.

Figure 11:
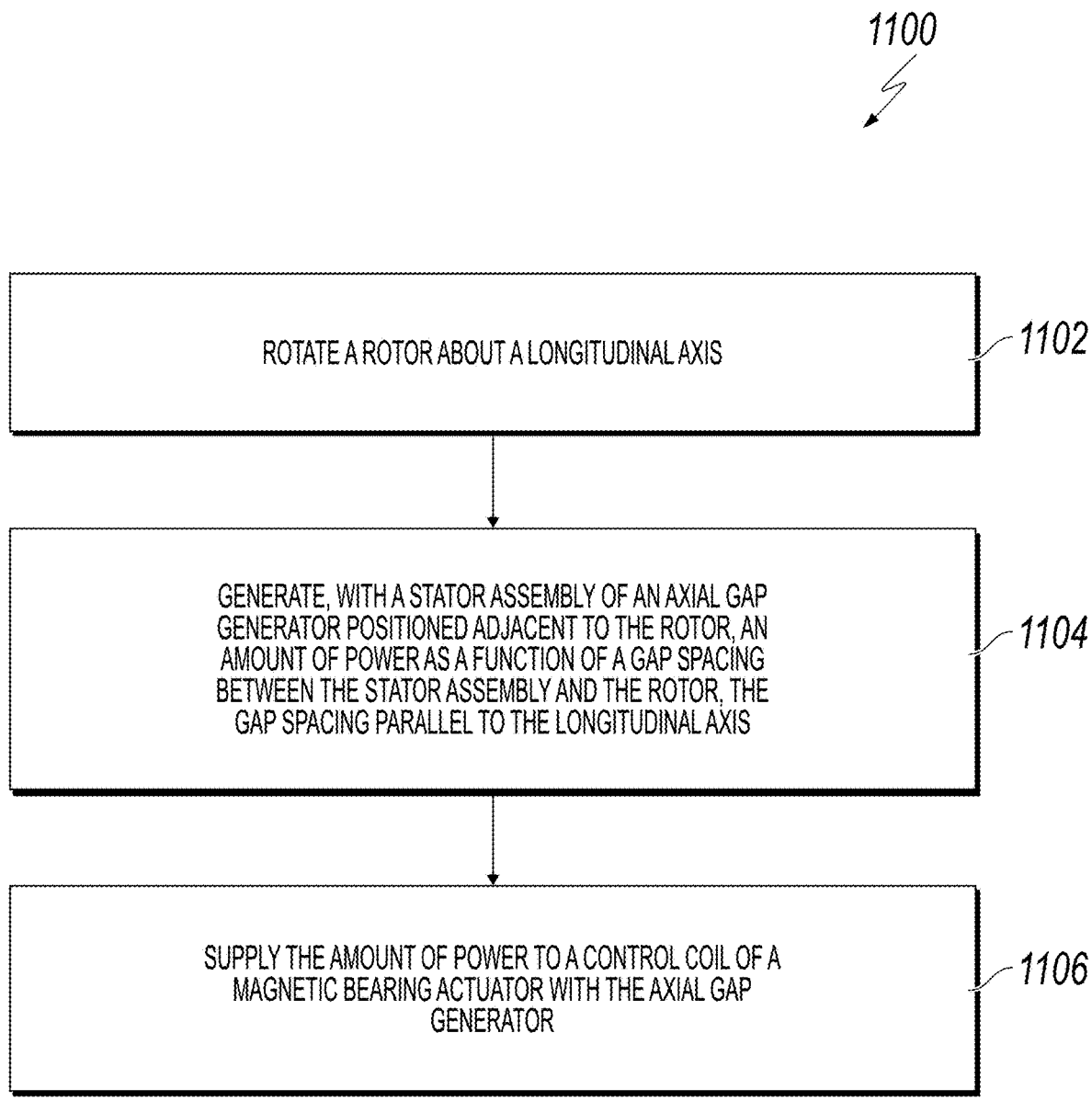

The components described previously within this disclosure can be used to implement the example method 1100 shown in FIG. 11. For example, method 1100 can be performed by the example axial gap generator assembly 702 of FIGS. 7 and 8A, the example axial gap generator assembly 702' of FIG. 8B, the example axial gap generator assembly 702" of FIG. 8C, or the example axial gap generator assembly 702''' of FIG. 8D. At 1102, a rotor is rotated about a longitudinal axis. At 1104, a stator assembly of an axial gap generator positioned adjacent to the rotor generates an amount of power as a function of a gap spacing between the stator assembly and the rotor, the gap spacing being parallel to the longitudinal axis. At 1106, the axial gap generator supplies the amount of power to a control coil of a magnetic bearing actuator.

A number of implementations have been described. Nevertheless, it will be understood that various modifications may be made. Accordingly, other implementations are within the scope of the following claims.

What is claimed is:

1. A method, comprising:
    rotating a rotor of a device about a longitudinal axis and within a housing of the device;
    generating, with a stator assembly of an axial gap generator positioned adjacent to a rotor assembly of an axial gap generator, a voltage signal as a function of a gap spacing between the stator assembly and the rotor assembly, the gap spacing parallel to the longitudinal axis, the rotor assembly of the axial gap generator coupled to the rotor of the device, and the stator assembly is mounted to the housing of the device; and
    varying, with the stator assembly, the voltage signal based on the gap spacing in response to a displacement of the rotor relative to the stator assembly.

2. The method of claim 1, where the device is a downhole device.

3. The method of claim 1, where the device is a motor, pump, compressor, blower, or thrust bearing.

4. The method of claim 1, where the voltage signal is linearly proportional to the gap spacing.

5. The method of claim 1, where the voltage signal is non-linearly proportional to the gap spacing.

6. A method comprising:
    rotating a rotor of a device about a longitudinal axis and within a housing of the device;
    generating, with a stator assembly of an axial gap generator positioned adjacent to a rotor assembly of an axial gap generator, a voltage signal as a function of a gap spacing between the stator assembly and the rotor assembly, the gap spacing parallel to the longitudinal axis, the rotor assembly of the axial gap generator coupled to the rotor of the device; and varying, with the stator assembly, the voltage signal based on the gap spacing in response to a displacement of the rotor relative to the stator assembly;

receiving, with a controller, the voltage signal from the axial gap generator; and in response to receiving the voltage signal, determining, with the controller, an axial position of the rotor based on the received voltage signal.

7. The method of claim 6, further comprising determining, with the controller, a speed of the rotor based on a frequency of the received voltage signal.

8. A method of comprising:

rotating a rotor of a device about a longitudinal axis and within a housing of the device;

generating, with a stator assembly of an axial gap generator positioned adjacent to a rotor assembly of an axial gap generator, a voltage signal as a function of a gap spacing between the stator assembly and the rotor assembly, the gap spacing parallel to the longitudinal axis, the rotor assembly of the axial gap generator coupled to the rotor of the device;

varying, with the stator assembly, the voltage signal based on the gap spacing in response to a displacement of the rotor relative to the stator assembly; and generating, with a second stator assembly of a second axial gap generator positioned adjacent to the rotor assembly of the axial gap generator, a second voltage signal as a function of a second gap spacing between the second stator assembly and the rotor assembly, the second gap spacing parallel to the longitudinal axis, where the second stator assembly voltage signal is combined with the first stator assembly voltage signal to provide one voltage signal proportional to gap spacing.

9. The method of claim 8, where the first stator voltage signal is 180 electrical degrees out of phase with the second stator voltage signal.

10. The method of claim 8, where the first stator voltage signal is in phase with the second stator voltage signal.

11. The method of claim 8, where the first stator voltage signal is of one polarity and the second stator voltage signal is of the opposite polarity.

12. The method of claim 8, where the first stator voltage signal and the second stator voltage signal are of one polarity.

13. A method comprising:

rotating a rotor of a device about a longitudinal axis and within a housing of the device;

generating, with a stator assembly of an axial gap generator positioned adjacent to a rotor assembly of an axial gap generator, a voltage signal as a function of a gap spacing between the stator assembly and the rotor assembly, the gap spacing parallel to the longitudinal axis, the rotor assembly of the axial gap generator coupled to the rotor of the device;

varying, with the stator assembly, the voltage signal based on the gap spacing in response to a displacement of the rotor relative to the stator assembly;

generating, with a second stator assembly of a second axial gap generator positioned adjacent to the rotor assembly of an axial gap generator, a second voltage signal as a function of a second gap spacing between the second stator assembly and the rotor assembly, the second gap spacing parallel to the longitudinal axis, where the second stator assembly is mounted to a movable support structure; and moving, with the movable support structure, the second stator assembly parallel to the longitudinal axis based at least in part on a physical property of an environment about the movable support structure.

14. The method of claim 13, further comprising:

receiving, at a controller, the first-mentioned voltage signal from the first-mentioned axial gap generator and the second voltage signal from the second axial gap generator;

determining, with the controller, an axial position of the rotor based on the received first-mentioned voltage signal; and in response to determining the axial position of the rotor, determining, with the controller, the physical property of the environment about the movable support structure based at least in part on the second voltage signal.

\* \* \* \* \*

UNITED STATES PATENT AND TRADEMARK OFFICE
CERTIFICATE OF CORRECTION

| | |
|---|---|
| PATENT NO. | : 11,646,631 B2 |
| APPLICATION NO. | : 16/544579 |
| DATED | : May 9, 2023 |
| INVENTOR(S) | : Patrick McMullen and Herman Artinian |

Page 1 of 1

It is certified that error appears in the above-identified patent and that said Letters Patent is hereby corrected as shown below:

In the Claims

Column 34, Line 60, Claim 6, delete "method" and insert -- method, --

Column 35, Line 14, Claim 8, delete "method of" and insert -- method, --

Column 36, Line 4, Claim 13, delete "method" and insert -- method, --

Signed and Sealed this
Twenty-fourth Day of October, 2023

Katherine Kelly Vidal
*Director of the United States Patent and Trademark Office*